(12) United States Patent
Agarwal et al.

(10) Patent No.: US 9,769,087 B2
(45) Date of Patent: Sep. 19, 2017

(54) PROVIDING OWNERSHIP-BASED VIEW AND MANAGEMENT OF SHARED OPTICAL NETWORK RESOURCES

(71) Applicant: Infinera Corporation, Sunnyvale, CA (US)

(72) Inventors: Manish K. Agarwal, Bangalore (IN); Naveen Narasimha Hegde, Bangalore (IN); Pankaj Sajnani, Bangalore (IN); Sudhanshu Verma, Sunnyvale, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/870,881

(22) Filed: Sep. 30, 2015

(65) Prior Publication Data

US 2017/0041690 A1    Feb. 9, 2017

(51) Int. Cl.
*H04B 10/00*    (2013.01)
*H04L 12/927*   (2013.01)
*H04J 14/02*    (2006.01)

(52) U.S. Cl.
CPC ........ *H04L 47/808* (2013.01); *H04J 14/0213* (2013.01); *H04J 14/0272* (2013.01)

(58) Field of Classification Search
CPC ............ H04Q 11/0066; H04Q 11/0086; H04L 47/808
See application file for complete search history.

(56) References Cited

U.S. PATENT DOCUMENTS

| | | | | |
|---|---|---|---|---|
| 6,335,927 B1 * | 1/2002 | Elliott | ..................... | H04L 12/14 370/352 |
| 6,671,256 B1 * | 12/2003 | Xiong | ................. | H04J 14/0227 370/230 |
| 6,760,306 B1 * | 7/2004 | Pan | ..................... | H04L 12/5695 370/230 |
| 6,775,701 B1 * | 8/2004 | Pan | ..................... | H04L 12/5695 709/226 |
| 7,065,042 B1 * | 6/2006 | Pan | ..................... | H04L 12/5695 370/229 |
| 8,014,273 B1 * | 9/2011 | Barrett | ................ | H04L 41/0896 370/210 |
| 8,064,463 B1 * | 11/2011 | Selby | .................... | H04L 47/762 370/395.41 |

(Continued)

*Primary Examiner* — Danny Leung
(74) *Attorney, Agent, or Firm* — David L. Soltz

(57) ABSTRACT

A device may receive optical network information associated with an optical network, and may determine a user associated with network resources of the optical network. The network resources may be shared for use by multiple users, including the user. The device may store the optical network information and information that identifies a relationship between the user and the network resources. The device may receive a request for at least a portion of the optical network information associated with the user and the network resources. The device may identify the network resources, associated with the user, based on storing the optical network information and the information that identifies the relationship The device may provide the at least the portion of the optical network information, including information associated with the network resources associated with the user, based on identifying the network resources.

20 Claims, 17 Drawing Sheets

(56) References Cited

U.S. PATENT DOCUMENTS

| | | | |
|---|---|---|---|
| 8,472,919 B1* | 6/2013 | Sivalingham | H04W 12/06 455/410 |
| 2003/0117954 A1* | 6/2003 | De Neve | H04L 12/4641 370/230 |
| 2004/0114514 A1* | 6/2004 | Ghosal | G06F 9/505 370/230 |
| 2008/0144513 A1* | 6/2008 | Small | H04L 12/2602 370/238 |
| 2011/0153727 A1* | 6/2011 | Li | G06F 9/5055 709/203 |
| 2012/0216131 A1* | 8/2012 | Moyers | H04L 65/1069 715/757 |
| 2013/0111349 A1* | 5/2013 | Yan | G06F 9/5072 715/738 |
| 2013/0304909 A1* | 11/2013 | Pappu | H04L 43/04 709/224 |
| 2014/0066013 A1* | 3/2014 | Mascarenhas | H04W 12/06 455/411 |
| 2015/0006733 A1* | 1/2015 | Khan | H04L 47/70 709/226 |
| 2015/0134451 A1* | 5/2015 | Farrar | G06Q 30/0255 705/14.53 |

* cited by examiner

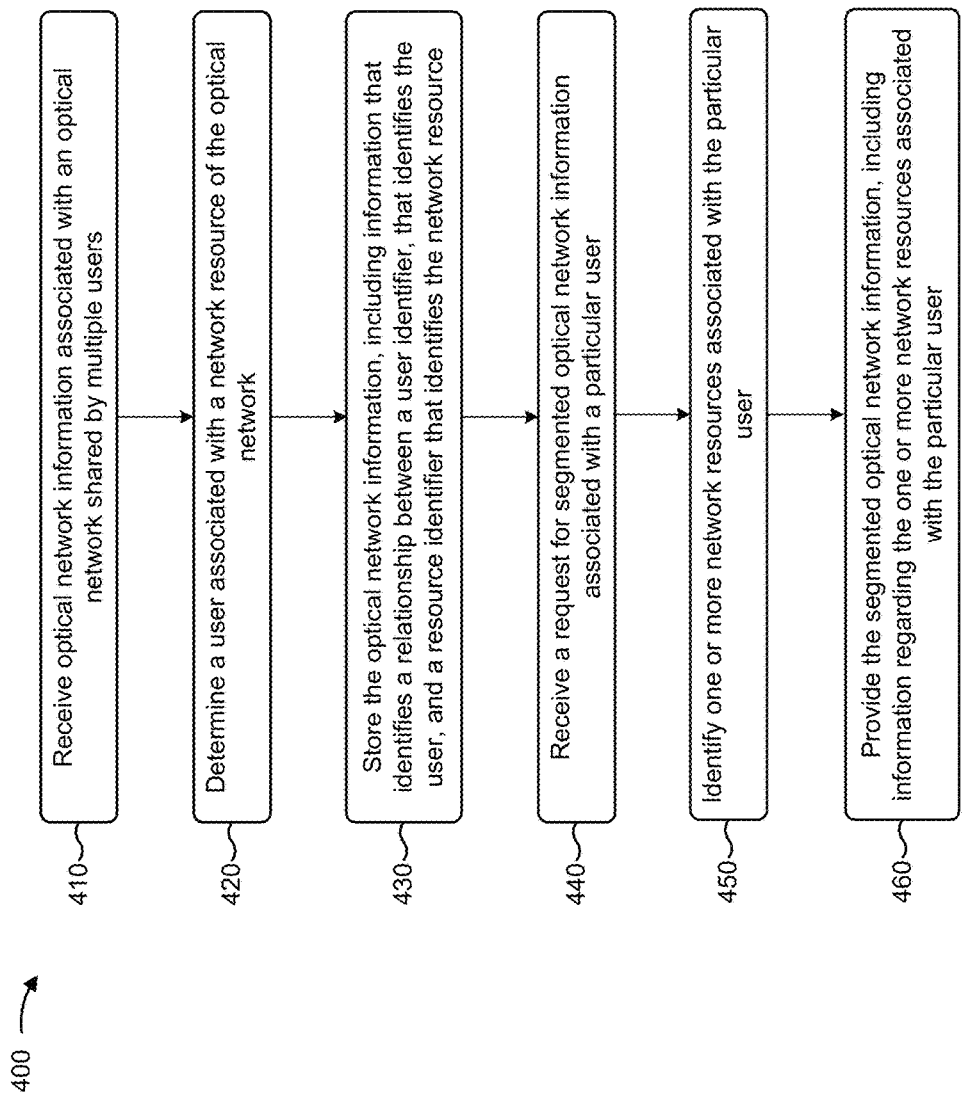

| | User ID | Network Element ID | Line Module ID | Transponder Module ID |
|---|---|---|---|---|
| 505 | | | | |
| 510 | Infrastructure Provider | NE-1 | All | All |
| | | NE-2 | All | All |
| | | NE-3 | All | All |
| 515 | Service Provider 1 | NE-1 | LM-1 | TM-2 |
| | | NE-2 | LM-1 | TM-2 |
| 520 | Service Provider 2 | NE-1 | LM-1 | TM-1, TM-3 |
| | | NE-2 | LM-1, LM-2 | None |
| | | NE-3 | LM-1 | TM-1, TM-3 |
| 525 | Customer 1 | NE-1 | LM-1 | TM-1 |
| | | NE-2 | LM-1, LM-2 | None |
| | | NE-3 | LM-1 | TM-1 |
| 530 | Customer 2 | NE-1 | LM-1 | TM-3 |
| | | NE-2 | LM-1, LM-2 | None |
| | | NE-3 | LM-1 | TM-3 |

FIG. 5A

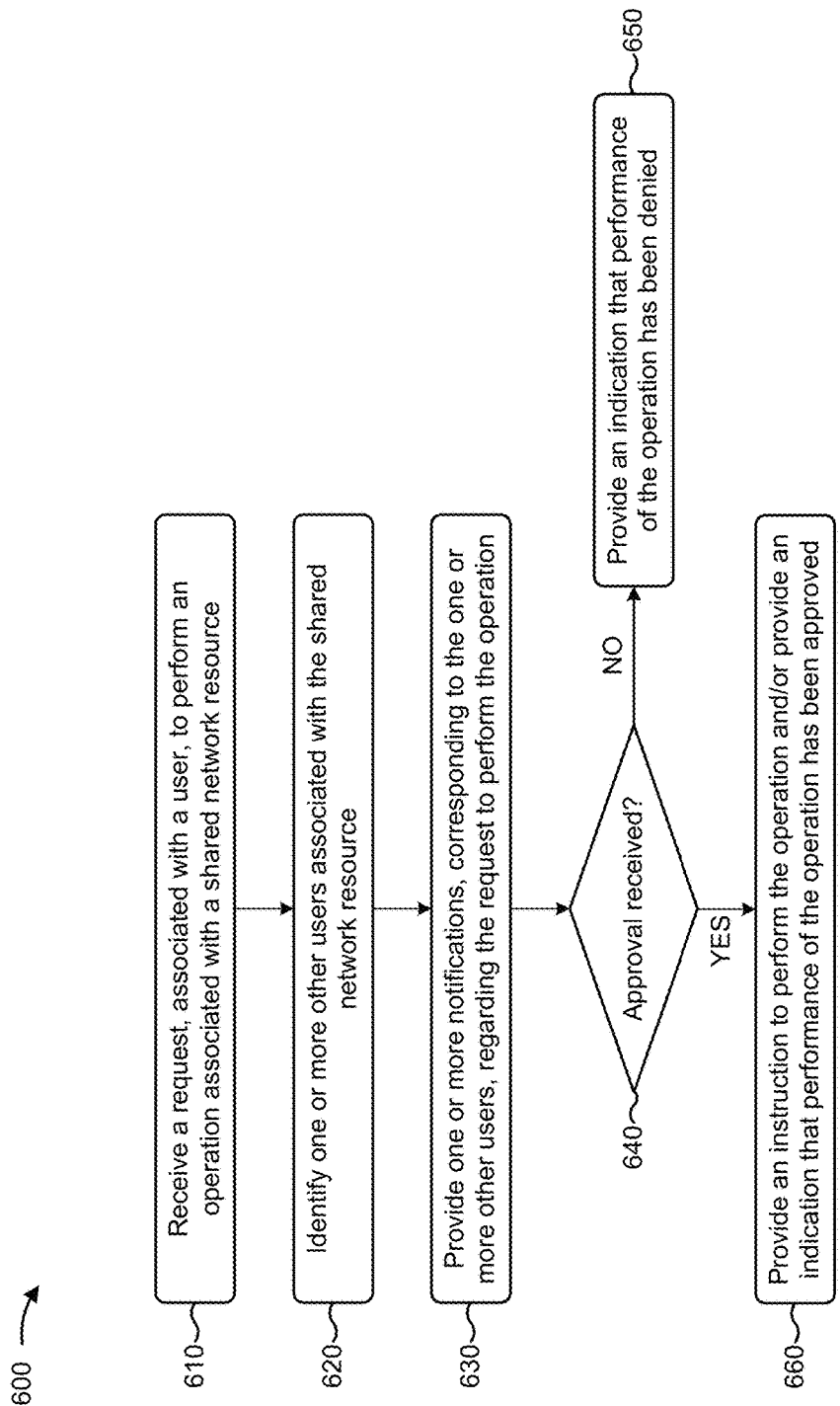

PROVIDING OWNERSHIP-BASED VIEW AND MANAGEMENT OF SHARED OPTICAL NETWORK RESOURCES

RELATED APPLICATION

This application claims priority under 35 U.S.C. §119 to Indian Provisional Patent Application No. 4020/CHE/2015, filed on Aug. 3, 2015, the content of which is incorporated by reference herein in its entirety.

BACKGROUND

In optical networks, signals may be transmitted at various wavelengths, with each wavelength corresponding to a transmission channel. Optical links may connect network elements so that signals may be transmitted throughout the optical network. An optical route may use a series of network elements and optical links to connect a source of an optical transmission with a destination for the optical transmission.

SUMMARY

According to some possible implementations, a device may receive optical network information associated with an optical network, and may determine a user associated with network resources of the optical network. The network resources may be shared for use by multiple users, including the user. The device may store the optical network information and information that identifies a relationship between the user and the network resources. The device may receive a request for at least a portion of the optical network information associated with the user and the network resources. The device may identify the network resources, associated with the user, based on storing the optical network information and the information that identifies the relationship The device may provide the at least the portion of the optical network information, including information associated with the network resources associated with the user, based on identifying the network resources.

According to some possible implementations, a non-transitory computer-readable medium may store instructions. The instructions may include one or more instructions that, when executed by one or more processors, cause the one or more processors to determine a first user, associated with a first network resource of an optical network, and to determine a second user associated with the first network resource. The first network resource may be shared by the first user and the second user. The one or more instructions may cause the one or more processors to determine a second network resource associated with the second user and not associated with the first user. The one or more instructions may cause the one or more processors to store information that identifies a first relationship between the first user and the first network resource, information that identifies a second relationship between the second user and the first network resource, and information that identifies a third relationship between the second user and the second network resource. The one or more instructions may cause the one or more processors to receive a request for optical network information associated with the first user, and to identify the first network resource as being associated with the first user based on storing the information that identifies the first relationship. The one or more instructions may cause the one or more processors to provide the optical network information associated with the first user based on identifying the first network resource. The optical network information associated with the first user may include information associated with the first network resource and may exclude information associated with the second network resource.

According to some possible implementations, a method may include determining, by a device, a plurality of users that share network resources associated with an optical network. A first user, of the plurality of users, may share a first network resource and may not share a second network resource. A second user, of the plurality of users, may share the second network resource and may not share the first network resource. The method may include storing, by the device, information that identifies a first relationship between the first user and the first network resource and information that identifies a second relationship between the second user and the second network resource. The method may include receiving, by the device, a first request for first optical network information associated with the first user, and receiving, by the device, a second request for second optical network information associated with the second user. The method may include identifying, by the device, the first network resource as being associated with the first user based on storing the information that identifies the first relationship and based on receiving the first request. The method may include identifying, by the device, the second network resource as being associated with the second user based on storing the information that identifies the second relationship and based on receiving the second request. The method may include providing, by the device and to a first user device associated with the first user, the first optical network information based on identifying the first network resource. The first optical network information may include information associated with the first network resource and may exclude information associated with the second network resource. The method may include providing, by the device and to a second user device associated with the second user, the second optical network information based on identifying the second network resource. The second optical network information may include information associated with the second network resource and may exclude information associated with the first network resource.

BRIEF DESCRIPTION OF DRAWINGS

FIG. 4 is a flow chart of an example process for providing an ownership-based view of shared optical network resources;

FIGS. 5A-5F are diagrams of an example implementation relating to the example process shown in FIG. 4;

FIG. 6 is a flow chart of an example process for managing shared optical network resources.

DETAILED DESCRIPTION

The following detailed description of example embodiments refers to the accompanying drawings. The same reference numbers in different drawings may identify the same or similar elements.

Administrators and/or users of an optical network may want to determine information associated with the optical network, such as diagnostic information that may be used to diagnose and/or correct problems associated with the optical network. Optical network information may include a wide variety of information, such as information associated with an optical link, an optical device, an optical component, an optical super-channel, an optical channel, or the like. In some cases, the optical network may include network resources (e.g., a network element, such as a network node; a physical resource of a network element, such as a line module or a transponder module; a logical resource of an optical network, such as a service object or a time slot; etc.) that are shared among multiple users. For example, a network resource may be owned by an infrastructure provider and may be licensed for use by a service provider, who may further license or provision use of network resources to a customer, etc.

When network resources are shared among multiple users, security issues may be introduced if a first user is permitted to view or modify a network resource associated with a second user. Similarly, service disruptions may occur if a first user is permitted to perform an operation on a network resource that is shared by a second user. Implementations described herein permit shared network resources to be viewed and/or modified by users with appropriate permission to view and/or modify the network resources (e.g., based on owning, leasing, licensing, etc. the network resource), thereby increasing network security. Furthermore, implementations described herein allow coordinated performance of operations, associated with a shared network resource, among users that share the network resource, thereby reducing service disruptions.

Figure 1A:
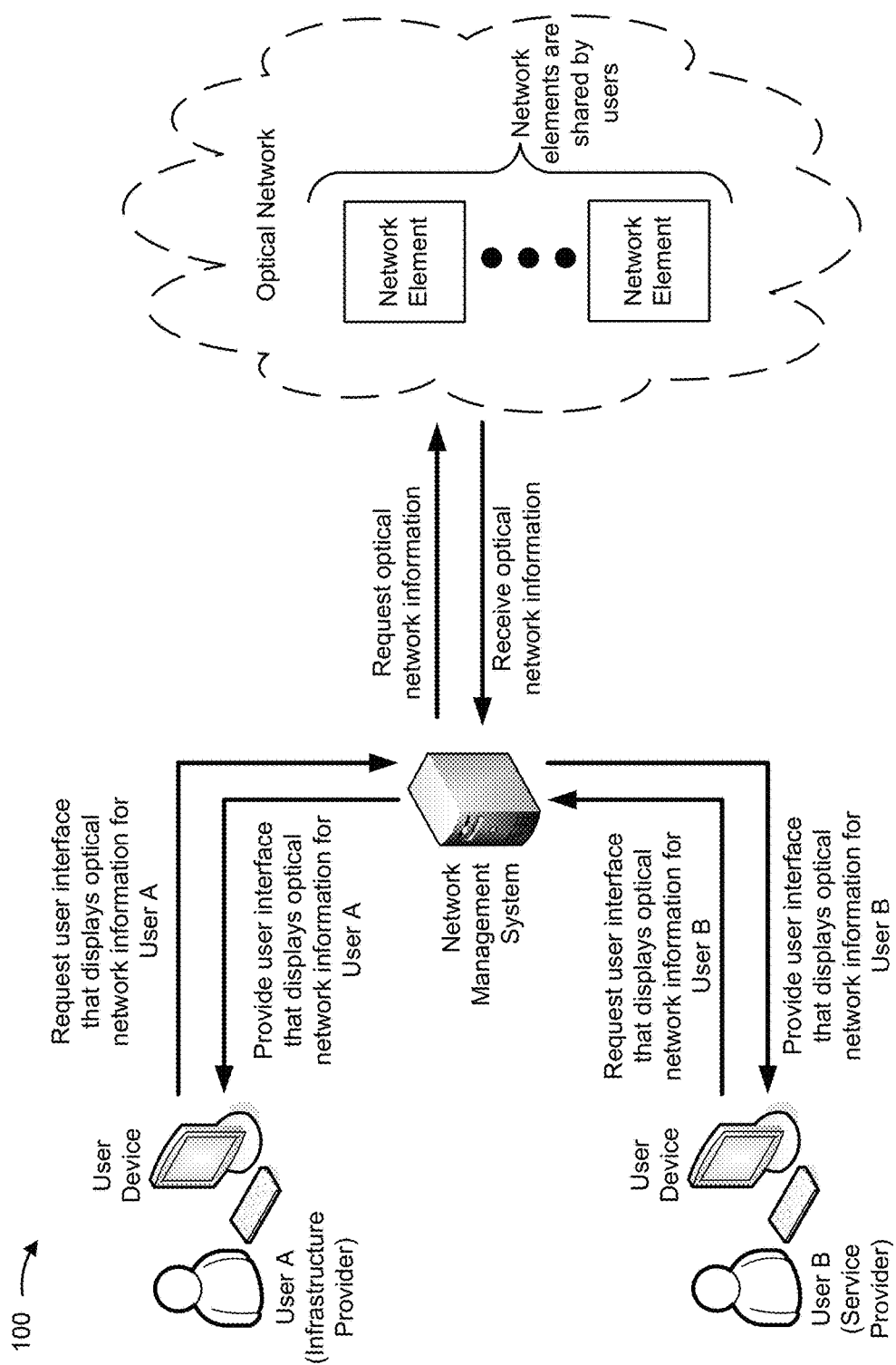
FIGS. 1A and 1B are diagrams of an overview of an example implementation described herein.
Figure 1B:
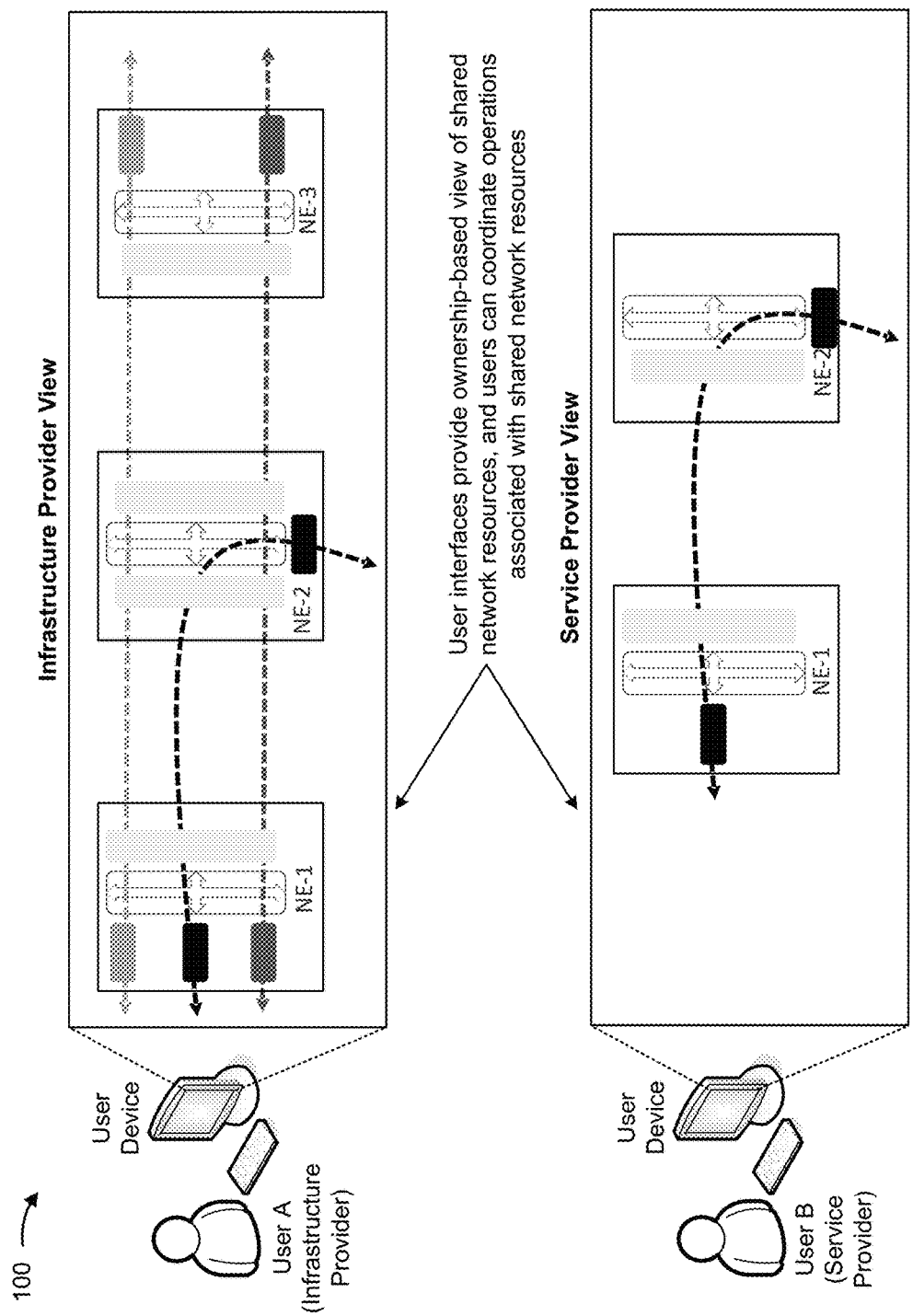

FIGS. 1A and 1B are diagrams of an overview of an example implementation 100 described herein. As shown in FIG. 1A, a first user, shown as User A, may interact with a user device to request, from a network management system, a user interface that displays optical network information associated with User A. In this case, assume that User A is an infrastructure provider that owns network resources (e.g., network elements, components of network elements, etc.) associated with an optical network. Similarly, a second user, shown as User B, may interact with a user device to request, from the network management system, a user interface that displays optical network information associated with User B. In this case, assume that User B is a service provider that leases network resources from the infrastructure provider.

As shown, the network management system may request optical network information from one or more network elements included in an optical network. The network elements or other network resources of the optical network may be shared by multiple users, such as User A and User B. The network management system may receive the optical network information from the network elements, and may store the optical network information in memory. The network management system may use the optical network information to determine network resources associated with User A, and may provide optical network information relating to those network resources to the user device associated with User A. Similarly, the network management system may use the optical network information to determine network resources associated with User B, and may provide optical network information relating to those network resources to the user device associated with User B. In this way, User A may view optical network information that is relevant for User A, and User B may view optical network information that is relevant for User B.

For example, and as shown in FIG. 1B, User A (e.g., the infrastructure provider) may view optical network information associated with network resources owned by User A. Similarly, User B may view optical network information associated with network resources leased by User B from User A. In this case, assume that User B has a license to user network element 1 (shown as NE-1) and network element 2 (shown as NE-2), but not network element 3 (NE-3). Further, assume that User B has a license to use some network resources of NE-1 and NE-2, but not other resources, as shown.

In this way, the network management system permits shared network resources to be viewed by users with appropriate permission to view the network resources, thereby increasing network security. For example, User B may not be permitted to view optical network information associated with network resources that are not licensed for use by User B. Furthermore, the network management system may allow multiple users that share a network resource to coordinate operations associated with the shared network resource, as described in more detail elsewhere herein. In this way, the network management system may reduce service disruptions.

Figure 2A:
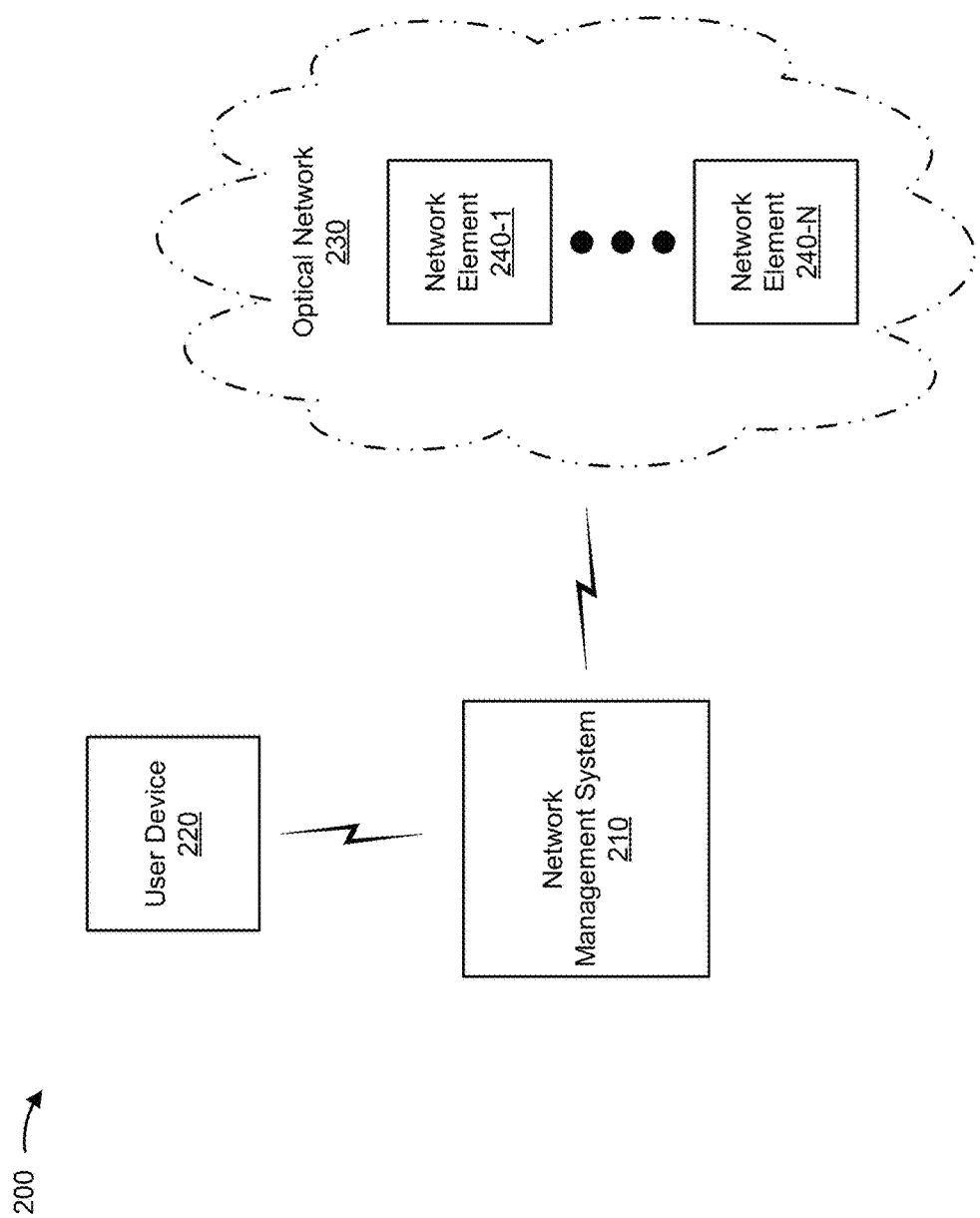
FIG. 2A is a diagram of an example environment in which systems and/or methods, described herein, may be implemented.

FIG. 2A is a diagram of an example environment 200 in which systems and/or methods, described herein, may be implemented. As shown in FIG. 2A, environment 200 may include a network management system 210, a user device 220, and an optical network 230, which may include a set of network elements 240-1 through 240-N (N≥1) (hereinafter referred to individually as "network element 240," and collectively as "network elements 240"). Devices of environment 200 may interconnect via wired connections, wireless connections, or a combination of wired and wireless connections.

Network management system 210 may include one or more devices capable of receiving, generating, storing, processing, and/or providing optical network information. For example, network management system 210 may include a computing device, such as a server, a desktop computer, a laptop computer, a cloud computing device, or a similar type of device. Network management system 210 may receive optical network information (e.g., from one or more network elements 240 of optical network 230). Network management system 210 may provide optical network information, associated with optical network 230, so that a user may view, modify, and/or interact with the optical network information. In some implementations, network management system 210 may provide the optical network information for display. Additionally, or alternatively, network management system may provide the optical network information to another device (e.g., user device 220) for display. In some implementations, network management system 210 may receive (e.g., from user device 220) information associated with a modification to optical network 230, and may provide information associated with the modification to optical network 230 and/or network elements 240 to configure optical network 230 based on the modification.

User device 220 may include one or more devices capable of receiving, generating, storing, processing, and/or providing optical network information. For example, user device 220 may include a computing device, such as a desktop computer, a laptop computer, a tablet computer, a mobile phone (e.g., a smart phone, a radiotelephone, etc.), or the like. User device 220 may receive optical network information (e.g., from network management system 210), and may provide the optical network information for display via a user interface.

Optical network 230 may include any type of network that uses light as a transmission medium. For example, optical network 230 may include a fiber-optic based network, an optical transport network, a light-emitting diode network, a laser diode network, an infrared network, and/or a combination of these or other types of optical networks. Optical network 230 may include one or more optical routes (e.g., optical lightpaths), that may specify a route along which light is carried (e.g., using one or more optical links) between two or more network elements 240. An optical link may include an optical fiber, an optical control channel, an optical data channel, or the like, and may carry an optical channel (e.g., a signal associated with a particular wavelength of light), an optical super-channel, a super-channel group, an optical carrier group, a set of spectral slices, or the like.

In some implementations, an optical link may carry a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

Network element 240 may include one or more devices capable of receiving, generating, storing, processing, and/or providing data, carried by an optical signal, via an optical link. For example, network element 240 may include one or more optical data processing and/or optical traffic transfer devices, such as an optical amplifier (e.g., a doped fiber amplifier, an erbium doped fiber amplifier, a Raman amplifier, etc.), an optical add-drop multiplexer ("OADM") (e.g., a reconfigurable optical add-drop multiplexer ("ROADM"), a flexibly reconfigurable optical add-drop multiplexer ("FROADM"), a fixed optical add-drop multiplexer ("FOADM"), etc.), an optical source device (e.g., a laser source), an optical destination device (e.g., a laser sink), an optical multiplexer, an optical demultiplexer, an optical transmitter, an optical receiver, an optical transceiver, a photonic integrated circuit, an integrated optical circuit, or the like.

In some implementations, network element 240 may include one or more optical components. Network element 240 may process and/or transmit an optical signal (e.g., to another network element 240 via an optical link) to deliver the optical signal through optical network 230. In some implementations, a network resource of optical network 230, such as a network element 240, a physical component of network element 240, a logical component of network element 240, or the like, may be shared by multiple users.

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

Figure 2B:
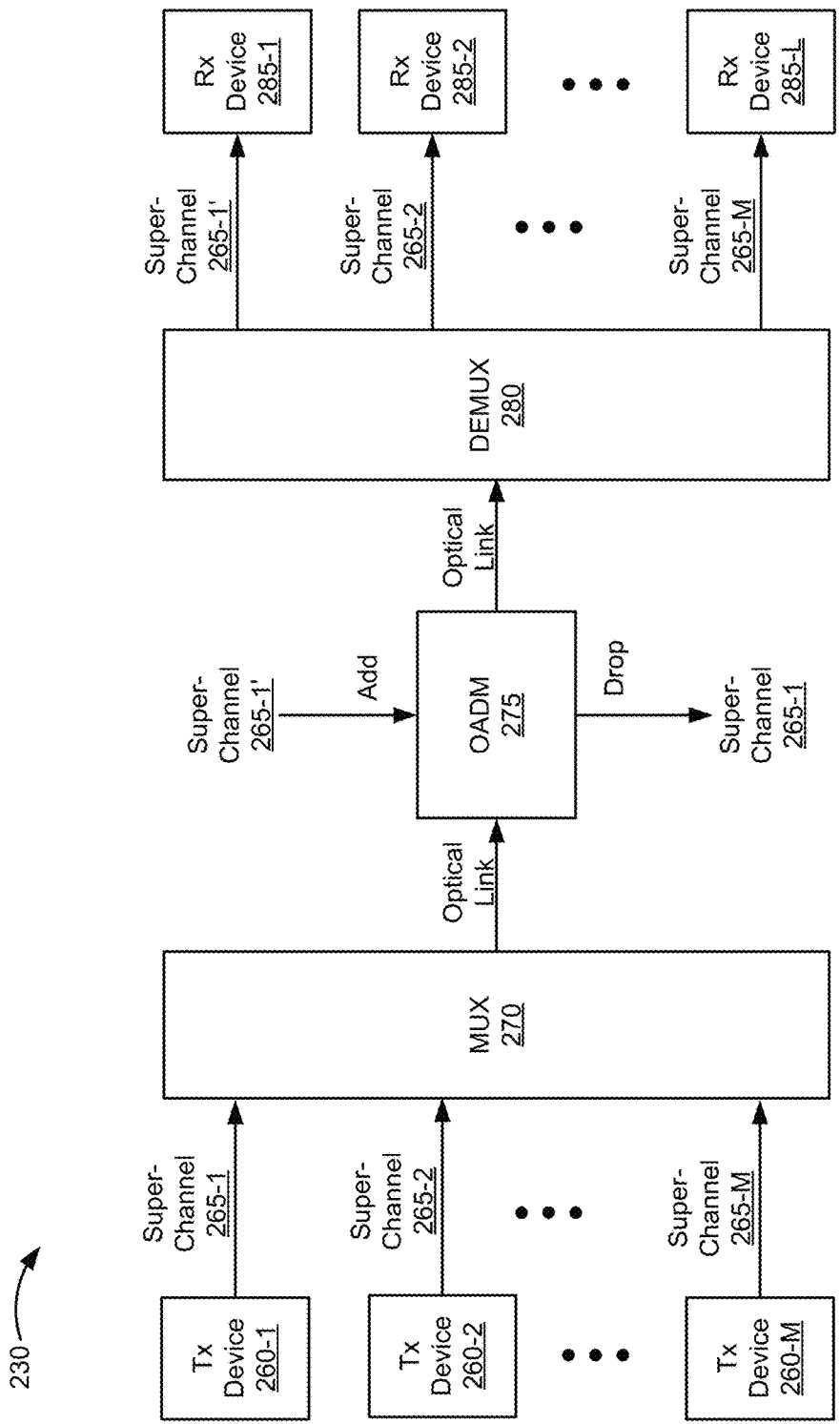
FIG. 2B is a diagram of example devices of an optical network that may be monitored and/or configured according to implementations described herein.

FIG. 2B is a diagram of example devices of optical network 230 that may be monitored and/or configured according to implementations described herein. One or more devices shown in FIG. 2B may operate within optical network 230, and may correspond to one or more network element 240 and/or one or more components of network element 240. As shown, optical network 230 may include a set of optical transmitter devices 260-1 through 260-M (M≥1) (hereinafter referred to individually as "Tx device 260," and collectively as "Tx devices 260"), a set of super-channels 265-1 through 265-M (M≥1) (hereinafter referred to individually as "super-channel 265," and collectively as "super-channels 265"), a multiplexer ("MUX") 270, an OADM 275, a demultiplexer ("DEMUX") 280, and a set of optical receiver devices 285-1 through 285-L (L≥1) (hereinafter referred to individually as "Rx device 285," and collectively as "Rx devices 285").

Tx device 260 may include, for example, an optical transmitter and/or an optical transceiver that generates an optical signal. For example, Tx device 260 may include one or more integrated circuits, such as a transmitter photonic integrated circuit (PIC), an application specific integrated circuit (ASIC), or the like. In some implementations, Tx device 260 may include a laser associated with each wavelength, a digital signal processor to process digital signals, a digital-to-analog converter to convert the digital signals to analog signals, a modulator to modulate the output of the laser, and/or a multiplexer to combine each of the modulated outputs (e.g., to form a combined output or WDM signal). One or more optical signals may be carried via super-channel 265. In some implementations, a single Tx device 260 may be associated with a single super-channel 265. In some implementations, a single Tx device 260 may be associated with multiple super-channels 265, or multiple Tx devices 260 may be associated with a single super-channel 265.

Super-channel 265 may include multiple channels multiplexed together using wavelength-division multiplexing to increase transmission capacity. Various quantities of channels may be combined into super-channels using various modulation formats to create different super-channel types having different characteristics. Additionally, or alternatively, an optical link may include a super-channel group. A super-channel group may include multiple super-channels multiplexed together using wavelength-division multiplexing to increase transmission capacity. Super-channel 265 is described in more detail herein in connection with FIG. 2C.

Multiplexer 270 may include, for example, an optical multiplexer (e.g., an arrayed waveguide grating) that combines multiple input super-channels 265 for transmission over an output fiber. For example, multiplexer 270 may combine super-channels 265-1 through 265-M, and may provide the combined super-channels 265 to OADM 275 via an optical link (e.g., a fiber).

OADM 275 may include, for example, a ROADM, a FROADM, a FOADM, or the like. OADM 275 may multiplex, de-multiplex, add, drop, and/or route multiple super-channels 265 into and/or out of a fiber (e.g., a single mode fiber). As illustrated, OADM 275 may drop super-channel 265-1 from a fiber, and may allow super-channels 265-2 through 265-M to continue propagating toward Rx device 285. Dropped super-channel 265-1 may be provided to a device (not shown) that may demodulate and/or otherwise process super-channel 265-1 to output the data stream carried by super-channel 265-1. As illustrated, super-channel 265-1 may be provisioned for transmission from Tx device 260-1 to OADM 275, where super-channel 265-1 may be dropped. As further shown, OADM 275 may add super-channel 265-1' to the fiber. Super-channel 265-1' may include one or more optical channels at the same or substantially the same wavelengths as super-channel 265-1. Super-channel 265-1' and super-channels 265-2 through 265-M may propagate to demultiplexer 280.

Demultiplexer 280 may include, for example, an optical de-multiplexer (e.g., an arrayed waveguide grating) that separates multiple super-channels 265 carried over an input fiber. For example, demultiplexer 280 may separate super-channels 265-1' and super-channels 265-2 through 265-M, and may provide each super-channel 265 to a corresponding Rx device 285.

Rx device 285 may include, for example, an optical receiver and/or an optical transceiver that receives an optical signal. For example, Rx device 285 may include one or more integrated circuits, such as a receiver PIC, an ASIC, or the like. In some implementations, Rx device 285 may include a demultiplexer to receive combined output and demultiplex the combined output into individual optical signals, a photodetector to convert an optical signal to a voltage signal, an analog-to-digital converter to convert voltage signals to digital signals, and/or a digital signal processor to process the digital signals. One or more optical signals may be received by Rx device 285 via super-channel 265. Rx device 285 may convert a super-channel 265 into one or more electrical signals, which may be processed to output information associated with each data stream carried by an optical channel included in super-channel 265. In some implementations, a single Rx device 285 may be associated with a single super-channel 265. In some implementations, a single Rx device 285 may be associated with multiple super-channels 265, or multiple Rx devices 285 may be associated with a single super-channel 265.

One or more devices shown in FIG. 2B may be a network element 240. In some implementations, a combination of devices shown in FIG. 2B may be a network element 240. For example, Tx devices 260-1 through 260-M and multiplexer 270 may be a network element 240. As another example, Rx devices 285-1 through 285-L and demultiplexer 280 may be a network element 240.

The number and arrangement of devices shown in FIG. 2B are provided as an example. In practice, there may be additional devices, fewer devices, different devices, or differently arranged devices, included in optical network 230, than those shown in FIG. 2B. Furthermore, two or more devices shown in FIG. 2B may be implemented within a single device, or a single device shown in FIG. 2B may be implemented as multiple, distributed devices. Additionally, or alternatively, a set of devices shown in FIG. 2B may perform one or more functions described as being performed by another set of devices shown in FIG. 2B.

Figure 2C:
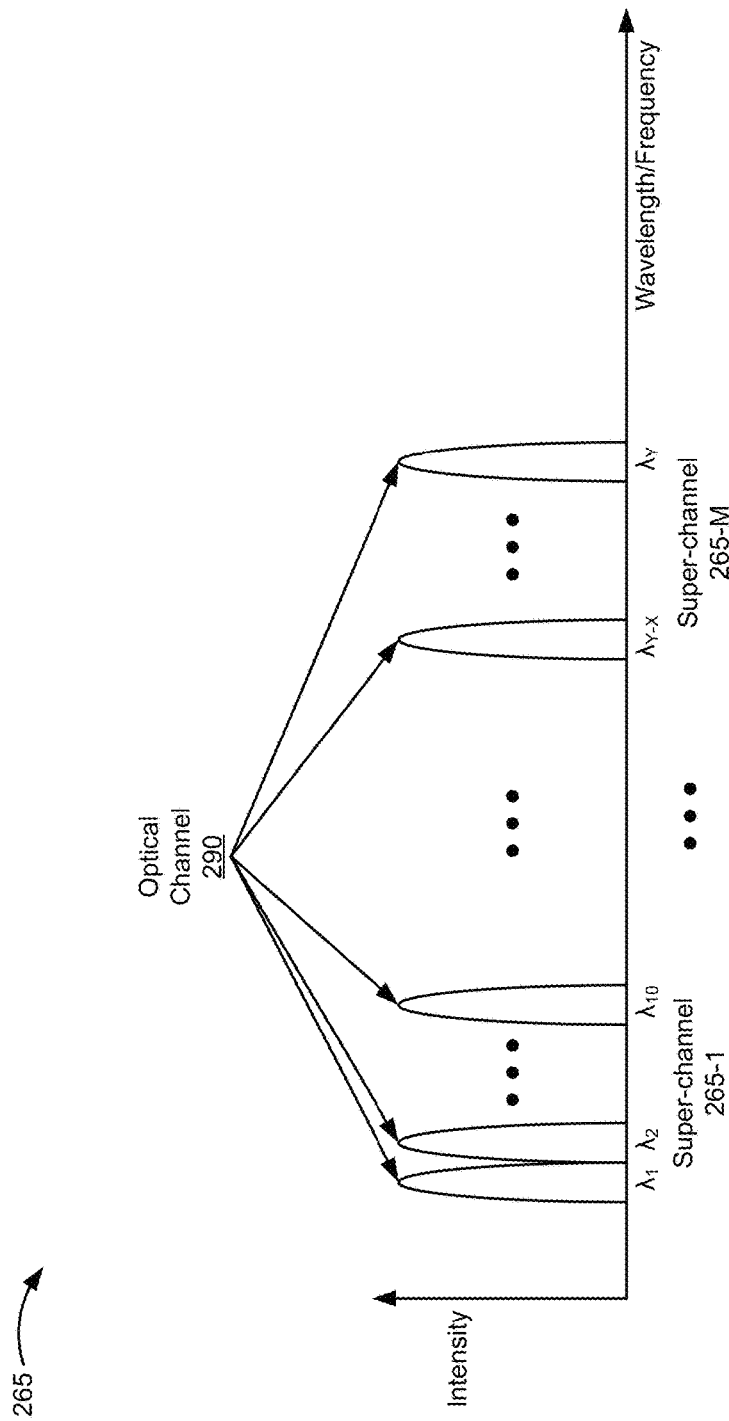
FIG. 2C is a diagram of example super-channels that may be monitored and/or configured according to implementations described herein.

FIG. 2C is a diagram of example super-channels 265 that may be monitored and/or configured according to implementations described herein. A super-channel may refer to multiple optical channels that are simultaneously transported over the same optical waveguide (e.g., a single mode optical fiber). Each optical channel included in a super-channel may be associated with a particular optical wavelength (or set of optical wavelengths). The multiple optical channels may be combined to create a super-channel using wavelength division multiplexing. For example, the multiple optical channels may be combined using dense wavelength division multiplexing, in which channel-to-channel spacing may be less than 1 nanometer. In some implementations, each optical channel may be modulated to carry an optical signal.

FIG. 2C shows an example frequency and/or wavelength spectrum associated with super-channels 265. In some implementations, the frequency and/or wavelength spectrum may be associated with a particular optical spectrum (e.g., C Band, C+ Band, CDC Band, etc.). As shown, super-channel 265-1 may include multiple optical channels 290, each of which corresponds to a wavelength λ (e.g., $\lambda_1$, $\lambda_2$, through $\lambda_{10}$) within a first wavelength band. Similarly, super-channel 265-M may include multiple optical channels 290, each of which corresponds to a wavelength λ (e.g., $\lambda_{Y-X}$ through $\lambda_Y$) within a second wavelength band. The quantity of depicted optical channels 290 per super-channel 265 is provided as an example. In practice, super-channel 265 may include any quantity of optical channels 290.

Optical channel 290 may be associated with a particular frequency and/or wavelength of light. In some implementations, optical channel 290 may be associated with a frequency and/or wavelength at which the intensity of light carried by optical channel 290 is strongest (e.g., a peak intensity, illustrated by the peaks on each optical channel 290). In some implementations, optical channel 290 may be associated with a set of frequencies and/or a set of wavelengths centered at a central frequency and/or wavelength. The intensity of light at the frequencies and/or wavelengths around the central frequency and/or wavelength may be weaker than the intensity of light at the central frequency and/or wavelength, as illustrated.

In some implementations, the spacing between adjacent wavelengths (e.g., $\lambda_1$ and $\lambda_2$) may be equal to or substantially equal to a bandwidth (or bit rate) associated with a data stream carried by optical channel 290. For example, assume each optical channel 290 included in super-channel 265-1 (e.g., $\lambda_1$ through $\lambda_{10}$) is associated with a 50 Gigabit per second ("Gbps") data stream. In this example, super-channel 265-1 may have a collective data rate of 500 Gbps (e.g., 50 Gbps×10). In some implementations, the collective data rate of super-channel 265 may be greater than or equal to 100 Gbps. Additionally, or alternatively, the spacing between adjacent wavelengths may be non-uniform, and may vary within a particular super-channel band (e.g., super-channel 265-1). In some implementations, optical channels 290 included in super-channel 265 may be non-adjacent (e.g., may be associated with non-adjacent wavelengths in an optical spectrum).

Each super-channel 265 may be provisioned in optical network 230 as one optical channel and/or as an individual optical channel. Provisioning of an optical channel may include designating a route for the optical channel through optical network 230. For example, an optical channel may be provisioned to be transmitted via a set of network elements 240. In some implementations, network elements 240 may be configured as a ring. Additionally, or alternatively, network elements 240 may be configured in a point-to-point configuration. Provisioning may be referred to as "allocating" and/or "allocation" herein. Even though each super-channel 265 is a composite of multiple optical channels 290, the optical channels 290 included in super-channel 265 may be routed together through optical network 230. Additionally, or alternatively, super-channel 265 may be managed and/or controlled in optical network 230 as though super-channel 265 included one optical channel at one wavelength.

The number and arrangement of super-channels and optical channels shown in FIG. 2C are provided as an example. In practice, there may be additional super-channels and/or optical channels, fewer super-channels and/or optical channels, different super-channels and/or optical channels, or differently arranged super-channels and/or optical channels than those shown in FIG. 2C.

Figure 3:
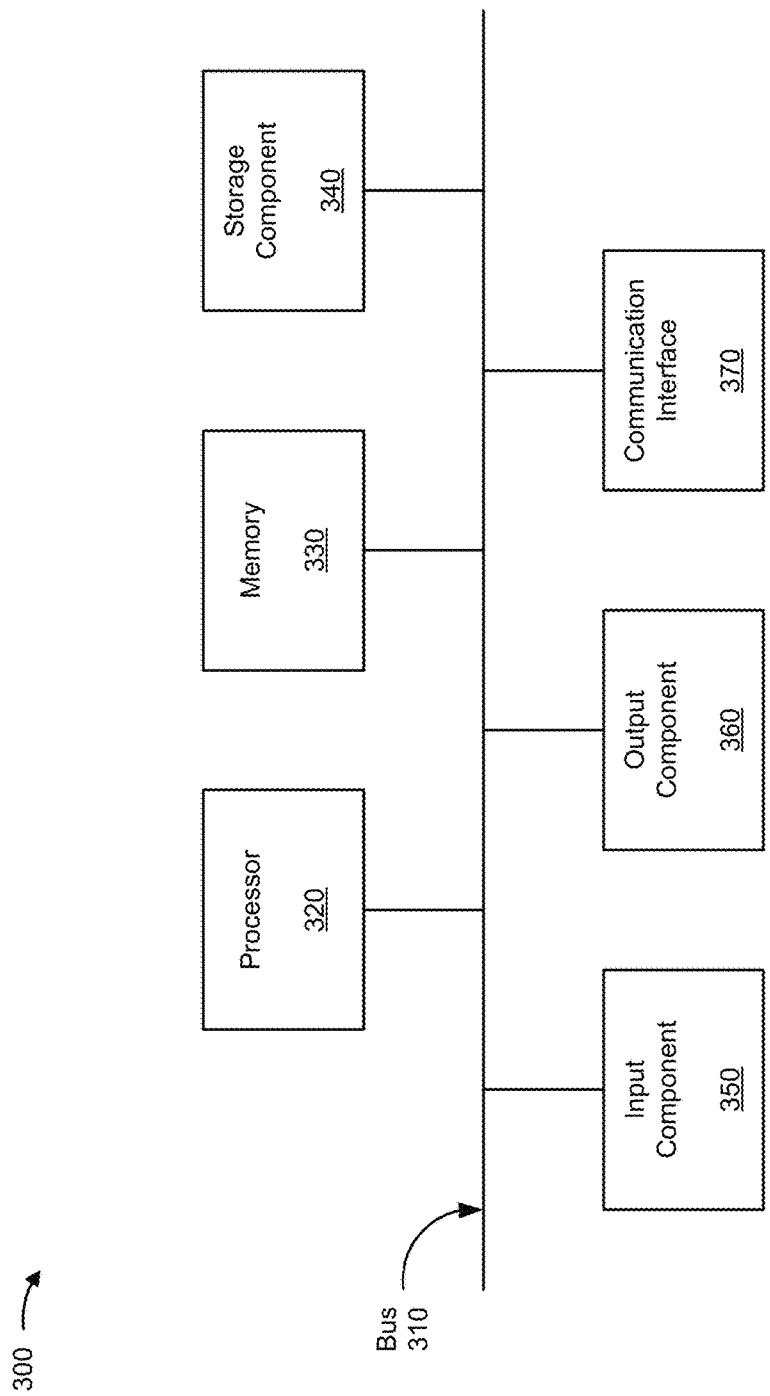
FIG. 3 is a diagram of example components of one or more devices and/or systems of FIG. 2A and/or FIG. 2B.

FIG. 3 is a diagram of example components of a device 300. Device 300 may correspond to network management system 210 and/or user device 220. In some implementations, network management system 210 and/or user device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing an ownership-based view of shared optical network resources. In some implementations, one or more process blocks of FIG. 4 may be performed by network management system 210. In some implementations, one or more process blocks of FIG. 4 may be performed by another device or a group of devices separate from or including network management system 210, such as user device 220 and/or network element 240.

As shown in FIG. 4, process 400 may include receiving optical network information associated with an optical network shared by multiple users (block 410). For example, network management system 210 may receive optical network information from network elements 240. In some implementations, network management system 210 may request and/or receive the optical network information on a periodic basis (e.g., every second, every minute, every hour, every day, every week, etc.). Additionally, or alternatively, network management system 210 may request and/or receive the optical network information based on input received from a user (e.g., a user request for the optical network information).

Optical network information may include information associated with optical network 230, such as information associated with one or more network elements 240, one or more components (e.g., physical components, logical components, etc.) of one or more network elements 240, one or more optical super-channels carried by one or more components, one or more optical channels included in one or more optical super-channels, one or more optical links between network elements 240, or the like.

In some implementations, network resources of optical network 230 may be shared by multiple users. A network resource may include, for example, network element 240, a component (e.g., a physical component, a logical component, etc.) of network element 240, or the like. In some implementations, multiple users may share a network resource based on shared ownership of the network resource, shared use of the network resource (e.g., due to multiple leases, multiple licenses, etc. of the network resource to multiple users), shared access to the network resource, or the like. As an example, an infrastructure provider may license use of a network resource to multiple service providers, a service provider may provision use of a network resource to multiple customers, or the like.

As further shown in FIG. 4, process 400 may include determining a user associated with a network resource of the optical network (block 420). For example, network management system 210 may determine a user associated with a network resource. In some implementations, network management system 210 may determine the user based on input from a network administrator that indicates that the user is associated with (e.g., has licensed, has been provisioned, etc.) the network resource. As an example, the network administrator may be permitted to access and/or view all of the network resources, and may assign network resources to users. In some implementations, an infrastructure provider may identify a service provider as a user for a network resource, a service provider may identify a customer as a user for a network resource, or the like. In some implementations, the user may be identified using a user identifier, and the network resource may be identified using a resource identifier.

As described above, a network resource may include a network element 240 and/or a component of network element 240. For example, a network resource may be shared equipment, a shared service, or the like. As an example, shared equipment may be a network element 240, a multiplexer module of network element 240, a line module associated with a multiplexer module, a transponder module associated with a line module, a physical end point associated with a transponder module, or the like. As another example, a shared service may be an optical transport service (OTS) (e.g., associated with a physical end point); an optical multiplexed service (OMS) associated with an OTS; an optical channel, optical transport unit (OTU), or optical data unit (ODU) associated with an OMS; a time slot associated with an optical channel, OTU, or ODU; or the like.

In this way, shared network resources may have different levels of granularity to form a hierarchy with a parent-child relationship. For example, a parent resource, such as a network element 240, may include multiple child resources, such as multiple multiplexer modules. Similarly, multiple child resources, such as multiple time slots, may be associated with a single parent resource, such as an optical channel. In some implementations, at higher levels of the hierarchy (e.g., at parent levels), multiple users may share a network resource that is divided among the multiple users at a lower level (e.g., a child level), and which may not be shared by the multiple users at the lower level. Implementations described herein may permit users to view shared resources at various levels of the hierarchy, while hiding non-shared resources at other levels of the hierarchy.

As further shown in FIG. 4, process 400 may include storing the optical network information, including information that identifies a relationship between a user identifier, that identifies the user, and a resource identifier that identifies the network resource (block 430). For example, network management system 210 may store the optical network information in a memory accessible by network management system 210. In some implementations, network management system 210 may store the optical network information using a data structure.

The optical network information may include a relationship indicator that indicates a relationship between a user identifier, that identifies a user, and a resource identifier that identifies a network resource. As an example, the user identifier may include a user name or some other identifier that identifies the user. As an example, the resource identifier may include a network resource name, a network resource address (e.g., a physical device address, a virtual device address, etc.), or the like.

In some implementations, a user may be associated with multiple network resources, and may request and receive optical network information associated with those network resources, as described below. Additionally, or alternatively, a network resource may be associated with multiple users (e.g., may be a shared network resource), and all of those users may be able to request and receive optical network information associated with those network resources, and may be able to coordinate operations associated with those network resources, as described below.

In this way, network management system 210 may be able to identify network resources associated with a user when the user requests optical network information associated with optical network 230. Network management system 210 may provide optical network information relating to the identified network resources, and may prevent optical network information associated with other network resources (e.g., not associated with the user) from being provided. In this way, network management system 210 may increase network security.

As further shown in FIG. 4, process 400 may include receiving a request for segmented optical network information associated with a particular user (block 440). For example, network management system 210 may receive a request (e.g., based on user input) for segmented optical network information associated with one or more network resources that are accessible by a particular user. The segmented optical network information may include optical network information associated with the particular user (e.g., associated with network resources that are associated with the particular user).

In some implementations, the segmented optical network information may include all of the optical network information. For example, the particular user may be a network administrator, an infrastructure provider, or some other type of user that has access to all network resources of optical network 230. A network administrator may be different from an infrastructure provider. For example, a network administrator (e.g., a super-user) may have full privileges and unrestricted access to all optical network information of all network resources associated with optical network 230, whereas an infrastructure provider may only have privileges and access to optical network information for network resources owned and/or managed by the infrastructure provider. Additionally, or alternatively, the network administrator may have unrestricted access to perform network operations on any network resource without requiring approval from other users (e.g., users that share the network resource), whereas an infrastructure provider may require approval from other users that share a network resource before a network operation, requested by the infrastructure provider, may be performed on the network resource. In some implementations, the segmented optical network information may include a portion (e.g., less than all) of the optical network information. For example, the particular user may be an infrastructure provider, a service provider, a customer, or some other type of user that has access to less than all network resources of optical network 230.

In some implementations, the request may identify the particular user via a user identifier (e.g., based on a user login, a management interface, etc.), which may be used to identify network resources associated with the particular user, as described below. Additionally, or alternatively, the request may be received in a variety of different formats and/or using a variety of different protocols. For example, the request may use an Extensible Markup Language (XML) protocol, a Simple Network Management Protocol (SNMP), a Transaction Language 1 (TL1) protocol, a Simple Object Access Protocol (SOAP), a Representational State Transfer (REST) protocol, or the like. In some implementations, network management system 210 may receive the request formatted using a first protocol, and may convert the request into a format using a second protocol to be used to submit a query (e.g., a search query) to identify network resources associated with the particular user. In this way, network management system 210 may provide a global solution that is compatible with a variety of protocols.

As further shown in FIG. 4, process 400 may include identifying one or more network resources associated with the particular user (block 450). For example, network management system 210 may search a data structure, using a user identifier associated with the particular user, to identify one or more network resources associated with the particular user. The data structure may include stored optical network information, as described above. For example, the data structure may include a relationship indicator that indicates a relationship between a user identifier and a resource identifier. Network management system 210 may use this relationship indicator to identify the network resources associated with the particular user.

As further shown in FIG. 4, process 400 may include providing the segmented optical network information, including information regarding the one or more network resources associated with the particular user (block 460). For example, network management system 210 may identify optical network information associated with the identified network resources accessible by the particular user. Network management system 210 may provide the identified optical network information (e.g., the segmented optical network information requested by the particular user).

In some implementations, network management system 210 may provide the segmented optical network information for display via a user interface associated with network management system 210. Additionally, or alternatively, network management system 210 may provide the segmented optical network information to another device, such as user device 220, and the other device may provide the segmented optical network information for display via a user interface. In this way, network management system 210 may ensure that a user may view only optical network information that is relevant to the user and that the user is permitted to access, thereby increasing network security.

In some implementations, a user may request to view optical network information associated with a particular network resource. For example, the request for segmented optical network information may identify a network resource using a resource identifier. In this case, network management system 210 may authenticate the user to determine whether to provide the requested optical network information to the user. For example, network management system 210 may determine whether a user identifier, that identifies the user, is stored in association with the resource identifier. If the user identifier is stored in association with the resource identifier, then network management system 210 may provide the requested optical network information. If the user identifier is not stored in association with the resource identifier, then network management system 210 may prevent the requested optical network information from being provided. In this case, network management system 210 may provide an error message that indicates that the user does not have permission to access the optical network information. In this way, network management system 210 may increase network security.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5E show an example of providing an ownership-based view of shared optical network resources.

As shown in FIG. 5A, network management system 210 may receive information that identifies a relationship between a user and a network resource, and may store the information in a data structure 505. For example, as shown by reference number 510, assume that a user identified as "Infrastructure Provider" has access to three network elements, identified as NE-1, NE-2, and NE-3. Further, assume that Information Provider has access to all line modules and all transponder modules on NE-1, NE-2, and NE-3.

As shown by reference number 515, assume that a user identified as "Service Provider 1" has access to NE-1 and NE-2. Further, assume that Service Provider 1 has access to line module LM-1 and transponder module TM-2 on NE-1, and has access to LM-1 and TM-2 on NE-2. In other words, assume that these network resources are shared between Service Provider 1 and other users.

As shown by reference number 520, assume that a user identified as "Service Provider 2" has access to NE-1, NE-2, and NE-3. Further, assume that Service Provider 2 has access to line module LM-1 and transponder modules TM-1 and TM-3 on NE-1, has access to LM-1 and LM-2 on NE-2, and has access to LM-1, TM-1, and TM-3 on NE-3.

As shown by reference number 525, assume that a user identified as "Customer 1" has access to NE-1, NE-2, and NE-3. Further, assume that Customer 1 has access to line module LM-1 and transponder module TM-1 on NE-1, has access to LM-1 and LM-2 on NE-2, and has access to LM-1 and TM-1 on NE-3.

As shown by reference number 530, assume that a user identified as "Customer 2" has access to NE-1, NE-2, and NE-3. Further, assume that Customer 2 has access to line module LM-1 and transponder module TM-3 on NE-1, has access to LM-1 and LM-2 on NE-2, and has access to LM-1 and TM-3 on NE-3.

Based on these stored relationships, network management system 210 may ensure that users have appropriate access to shared network resources, as described below.

For the purposes of FIGS. 5B-5F, assume that a user has requested segmented optical network information associated with network resources accessible by the user. Further, assume that network management system 210 uses data structure 505 to identify network resources associated with the user. Finally, assume that network management system 210 provides segmented optical network information, for the identified network resources, to a user device 220 associated with the user. As shown, user device 220 may use the segmented optical network information received from network management system 210 to generate a user interface that provides segmented optical network information specific to the user. The provided information corresponds to the optical network information to which the user has access, as described above in connection with data structure 505 of FIG. 5A.

Figure 5B:
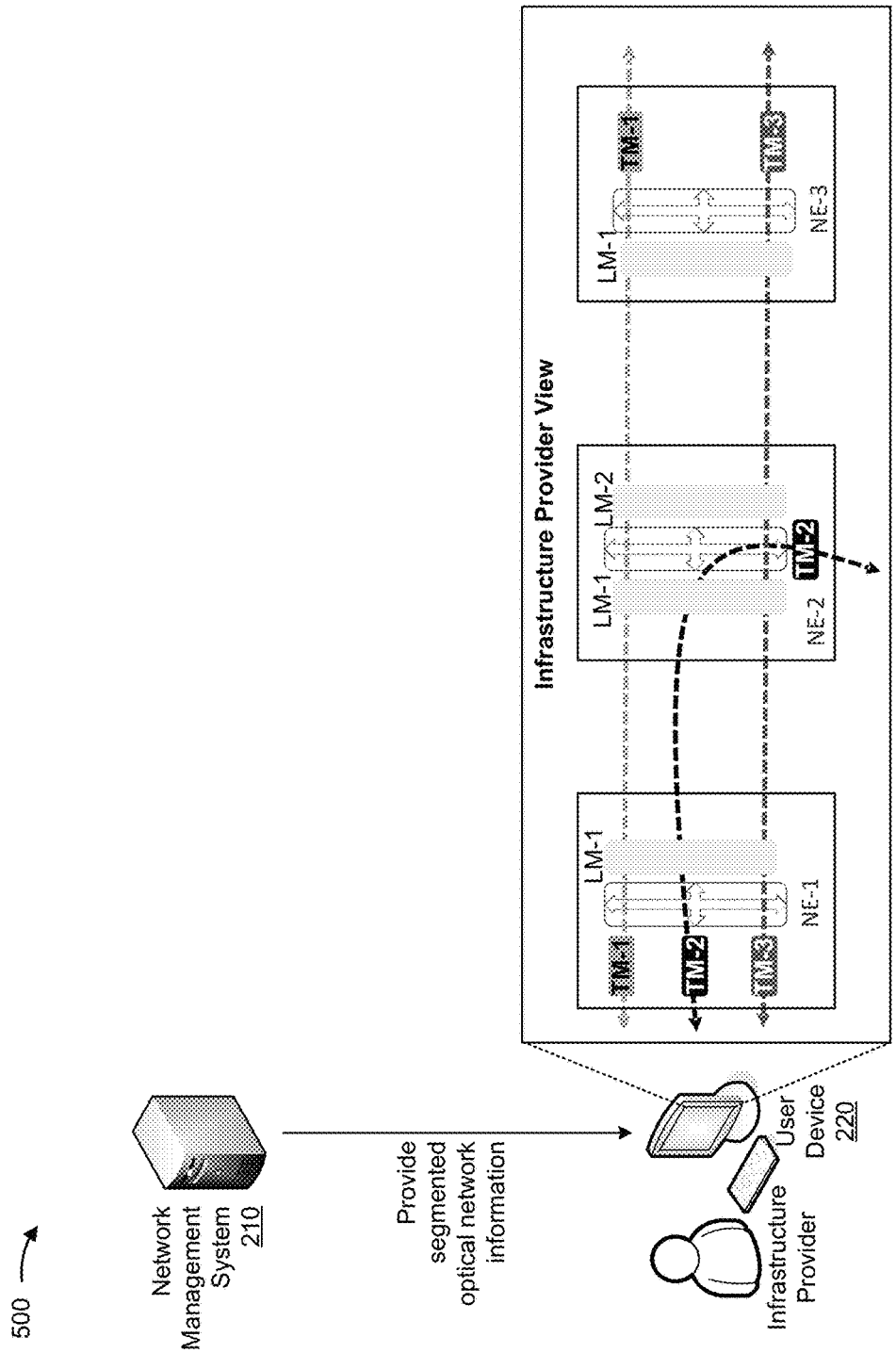
Figure 5C:
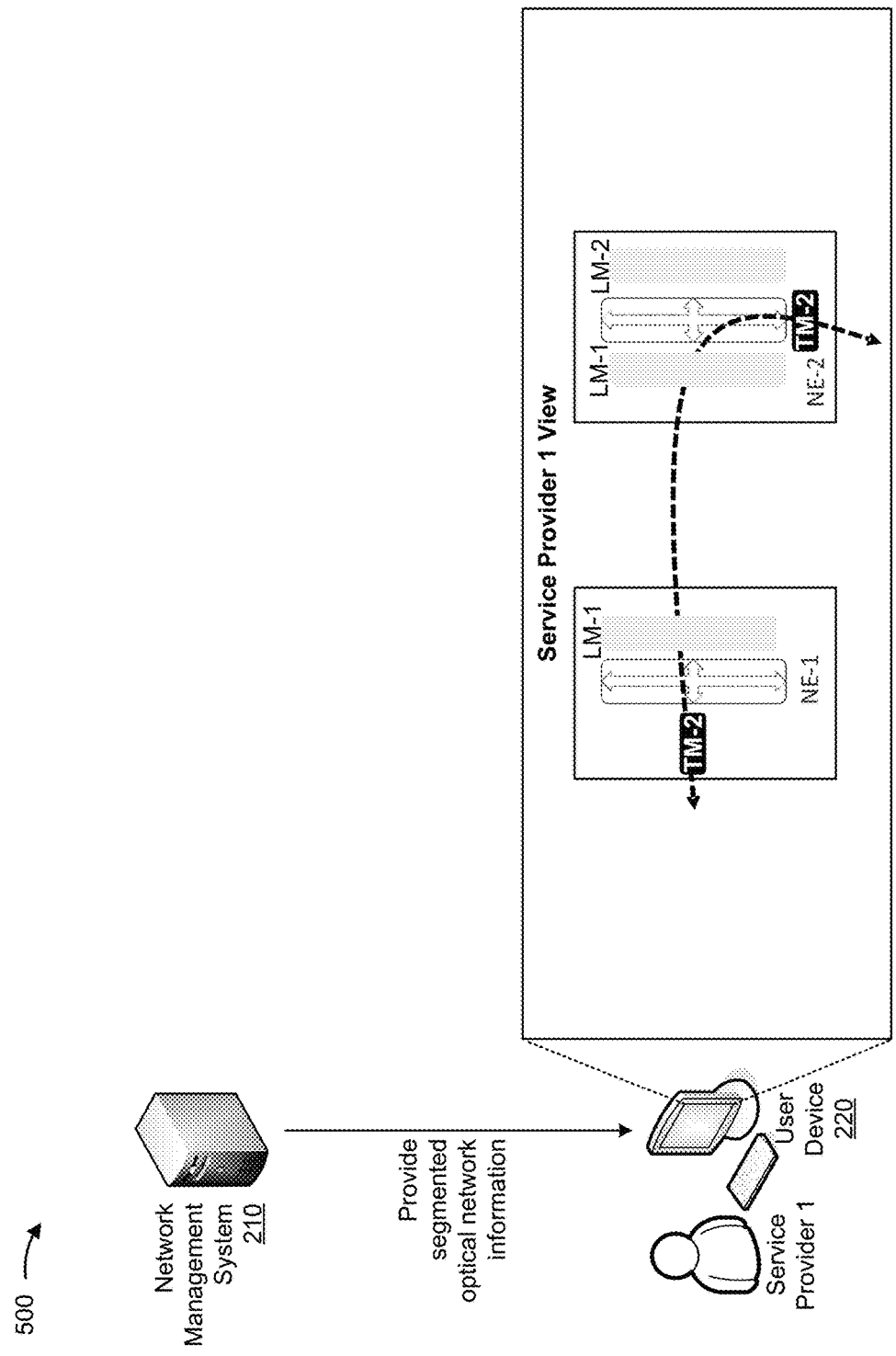
Figure 5D:
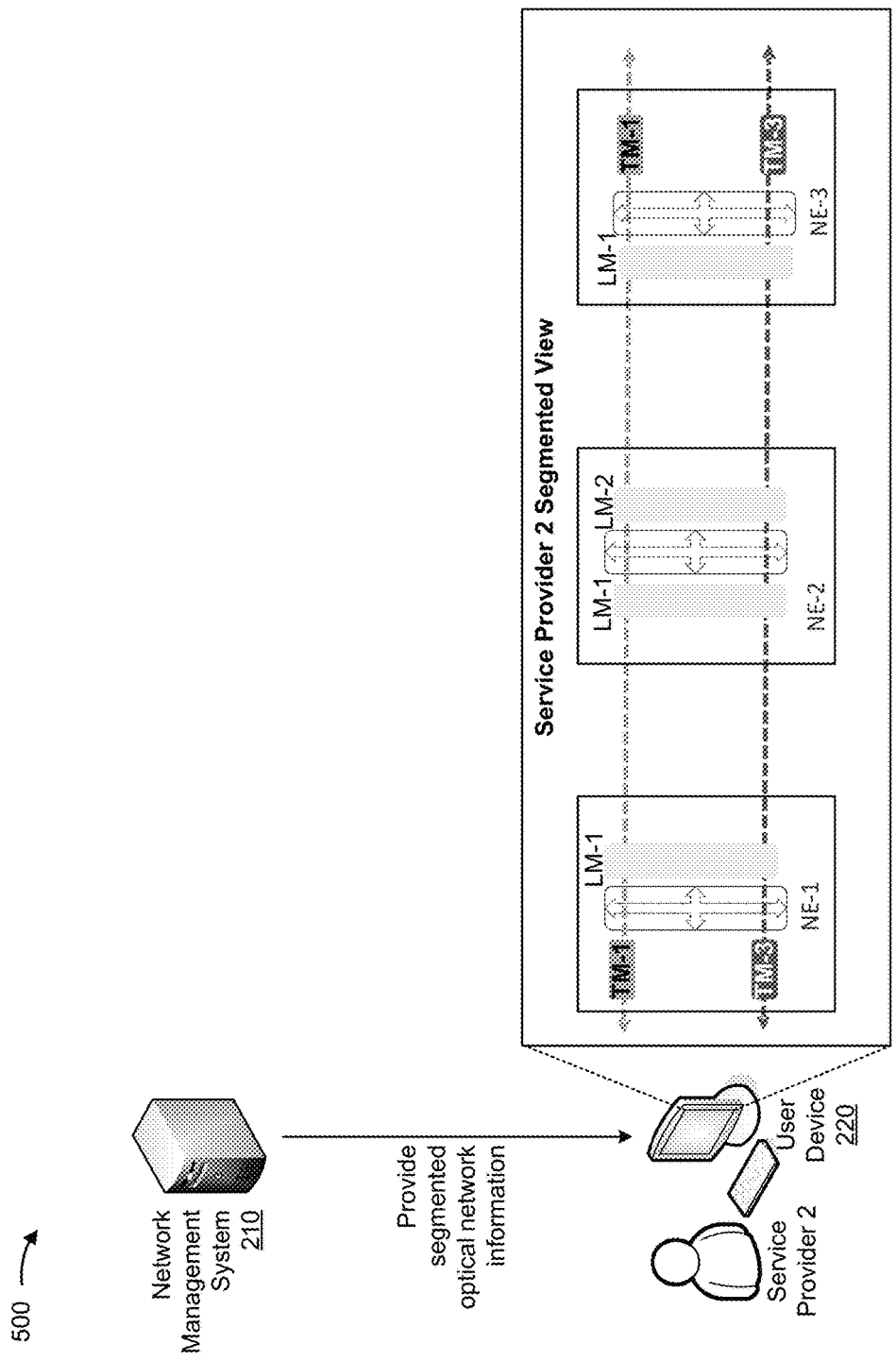
Figure 5E:
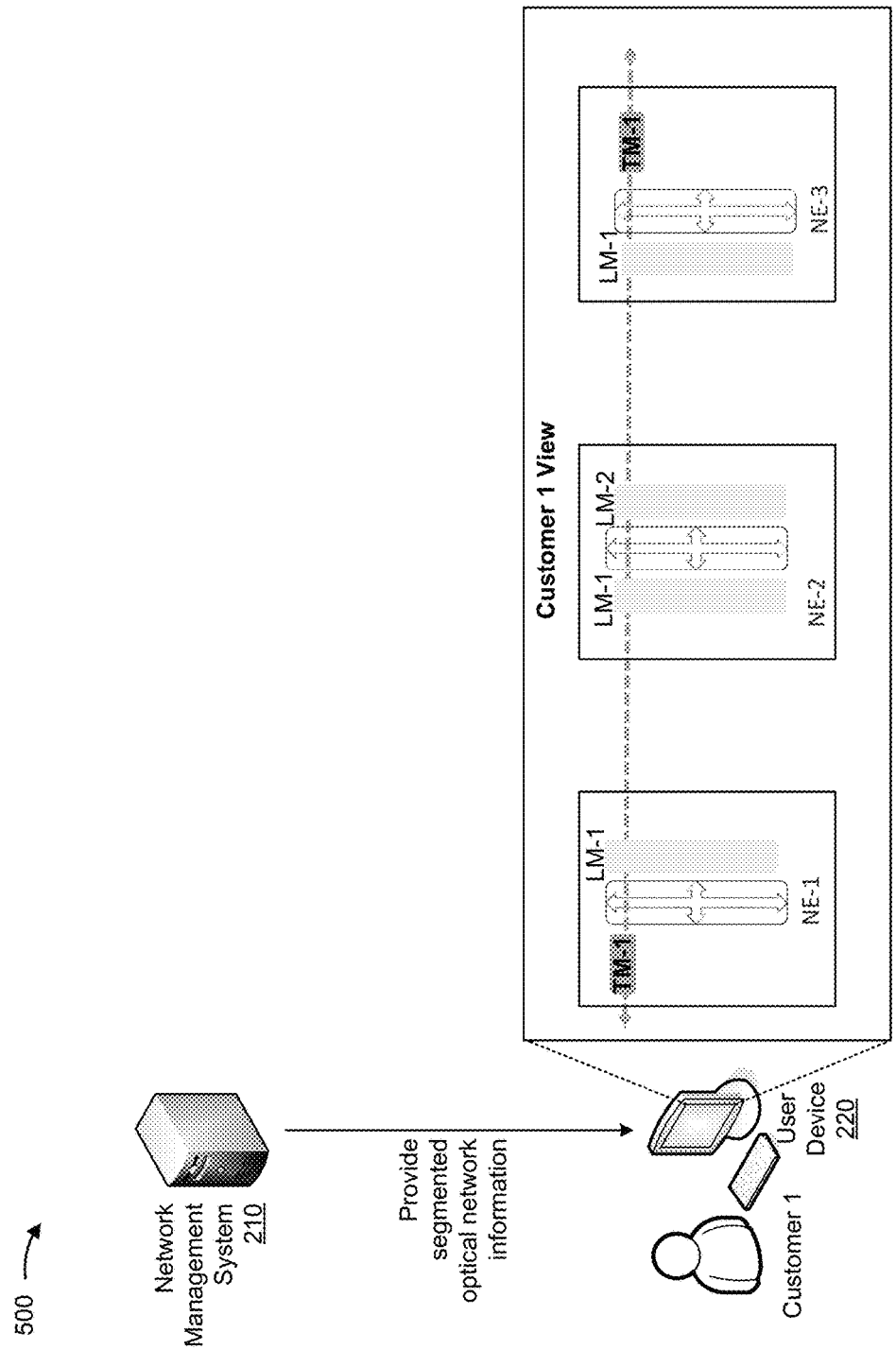
Figure 5F:
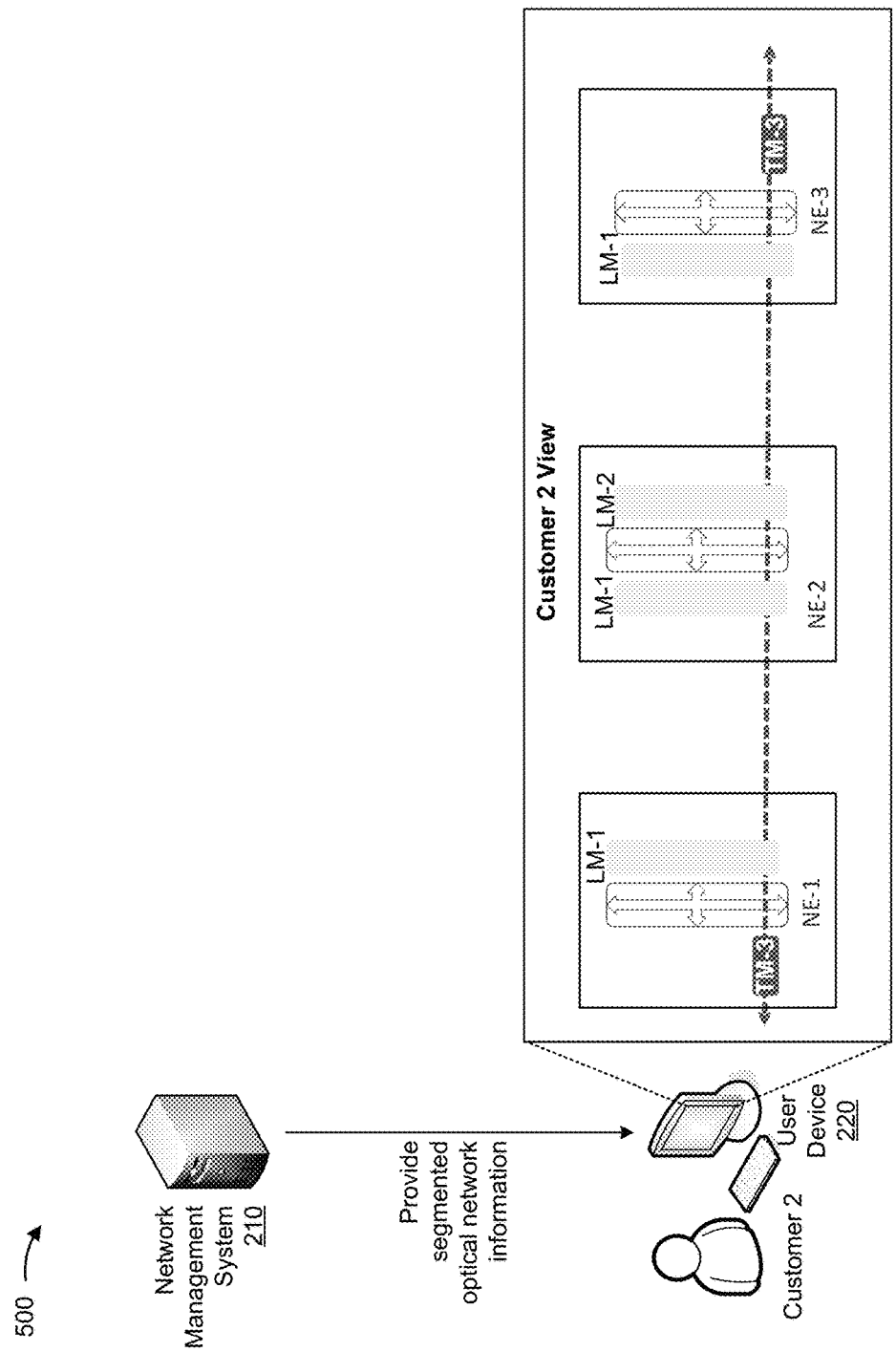

For example, FIG. 5B shows a user interface with optical network information associated with network resources to which Infrastructure Provider has access (e.g., as shown by reference number 510 of FIG. 5A). FIG. 5C shows a user interface with optical network information associated with network resources to which Service Provider 1 has access (e.g., as shown by reference number 515 of FIG. 5A). FIG. 5D shows a user interface with optical network information associated with network resources to which Service Provider 2 has access (e.g., as shown by reference number 520 of FIG. 5A). FIG. 5E shows a user interface with optical network information associated with network resources to which Customer 1 has access (e.g., as shown by reference number 525 of FIG. 5A). FIG. 5F shows a user interface with optical network information associated with network resources to which Customer 2 has access (e.g., as shown by reference number 530 of FIG. 5A).

In this way, network management system 210 may permit users to access and/or manage shared network resources to which the user is permitted access, thereby increasing network security.

As indicated above, FIGS. 5A-5F are provided as examples. Other examples are possible and may differ from what was described with regard to FIGS. 5A-5F.

FIG. 6 is a flow chart of an example process 600 for managing shared optical network resources. In some implementations, one or more process blocks of FIG. 6 may be performed by network management system 210. In some implementations, one or more process blocks of FIG. 6 may be performed by another device or a group of devices separate from or including network management system 210, such as user device 220 and/or network element 240.

As shown in FIG. 6, process 600 may include receiving a request, associated with a user, to perform an operation associated with a shared network resource (block 610). For example, network management system 210 may receive a request to perform an operation associated with a shared network resource. In some implementations, the user may interact with a user interface that provides segmented optical network information associated with a user, as described above in connection with FIG. 4. Network management system 210 may receive the request based on the user interaction.

In some implementations, the request may include a resource identifier that identifies a network resource on which the operation is to be performed. The operation may include an operation that impacts availability, functioning, performance, etc. of the network resource. For example, the operation may include an administrative lock operation that locks the network resource, a software or firmware upgrade of the network resource, a reboot of the network resource, an operation to take the network resource offline, or the like.

In some implementations, the request may be associated with a user, and/or may be received from user device 220. For example, the request may include a user identifier that identifies a user making the request. In this way, network management system 210 may identify other users associated with the shared network resource, as described below.

As further shown in FIG. 6, process 600 may include identifying one or more other users associated with the shared network resource (block 620), and providing one or more notifications, corresponding to the one or more other users, regarding the request to perform the operation (block 630). For example, network management system 210 may identify one or more other users (e.g., other than the user that made the request) associated with the shared network resource. In some implementations, network management system 210 may identify the other user(s) by searching a data structure using a resource identifier included in the request. The resource identifier may be associated with one or more user identifiers, which may correspond to the user(s) associated with the shared network resource. In some implementations, network management system 210 may not include the requesting user when determining the one or more other users. In some implementations, a first user and a second user of the other users may not be affiliated with one another (e.g., may not work at the same company).

Network management system 210 may provide one or more notifications corresponding to the one or more users. The notification(s) may indicate that there has been a request to perform an operation associated with a shared network resource. In some implementations, the notification may identify the shared network resource, the operation, the user requesting the operation, or the like. Network management system 210 may provide the notification(s) to user device(s) 220 associated with the non-requesting user(s), to e-mail address(es) associated with the non-requesting user(s), or to another destination associated with the non-requesting user(s). In some implementations, the notification may be provided via a user interface. For example, an alert icon that represents the notification may be provided via the user interface in connection with the shared network resource.

As further shown in FIG. 6, process 600 may include determining whether approval to perform the operation has been received from the one or more other users (block 640). For example, network management system 210 may determine whether approval has been received from all of the other, non-requesting users. In some implementations, network management system 210 may periodically determine whether all approvals have been received. Additionally, or alternatively, network management system 210 may determine whether all approvals have been received after each individual approval is received.

In some implementations, network management system 210 may provide information that identifies a deadline (e.g., a threshold amount of time) by which all approvals must be received. Additionally, or alternatively, if network management system 210 does not receive all approvals prior to the deadline (e.g., in the threshold amount of time), then network management system 210 may deny performance of the operation, as described below. In some implementations, if network management system 210 does not receive an indication to approve or deny performance of the operation by the deadline (e.g., if a user does not respond to the notification regarding the request to perform the operation), network management system 210 may provide an instruction to perform the operation and/or may permit the operation to be performed. In some implementations, a network administrator may be permitted to override pending approvals. In other words, the network administrator may be permitted to approve pending approvals for other users (e.g., before the deadline expires). Additionally, or alternatively, the network administrator may be permitted to deny (e.g., terminate) pending requests.

Additionally, or alternatively, network management system 210 may determine whether another operation has previously been requested for the shared network resource. If another operation has previously been requested (e.g., and is outstanding) then network management system 210 may deny performance of the operation, as described below. In this way, network management system 210 may prevent multiple operations from being performed concurrently on the shared network resource, thereby preventing errors.

In some implementations, network management system 210 may determine an operation type of the requested operation. In this case, network management system 210 may determine whether the operation type is a type that requires approval. For example, some operation types may be performed without approval, some operation types may require approval from all non-requesting users that share the network resource, some operation types may require approval from a subset of the non-requesting users (e.g., a majority of the non-requesting users, particular ones of the non-requesting users, etc.), or the like.

Additionally, or alternatively, network management system 210 may use the operation type to determine whether to approve or deny the operation by default. For example, a particular operation type may be approved by default unless a non-requesting user denies the operation before the deadline. As another example, a particular operation type may be denied by default unless one or more (e.g., all, a majority of, a single, etc.) non-requesting users approve the operation before the deadline.

As further shown in FIG. 6, if approval to perform the operation has not been received from the one or more other users (block 640—NO), then process 600 may include providing an indication that performance of the operation has been denied (block 650). For example, if network management system 210 does not receive all approvals from the other, non-requesting users (e.g., by the deadline), then network management system 210 may provide an indication that the operation has been denied. In some implementations, a user may directly deny performance of the operation, such as by interacting with an input mechanism of a user interface to deny performance of the operation. For example, a user may deny an operation if the user has data and/or high priority data to be provided via the shared network resource during a time period when the operation is requested. Additionally, or alternatively, a user may indirectly deny performance of the operation, such as by failing to respond to the notification by the deadline. Additionally, or alternatively, a user may deny the operation during a first time period, and may approve the operation during a second time period. For example, a user may indicate approval of the operation so long as the operation is performed during the second time period.

In some implementations, network management system 210 may provide the indication that performance has been denied to a user device 220 associated with the user that requested the operation. Additionally, or alternatively, network management system 210 may provide information that identifies a reason that the operation was denied. For example, network management system 210 may indicate that the operation was directly denied by one of the other users (e.g., and may provide information that identifies the non-requesting user), may provide input provided by the non-requesting user explaining why the non-requesting user denied the operation, may indicate that the operation was indirectly denied due to a failure by a non-requesting user to respond to the request by the deadline (e.g., and/or may provide information that identifies the non-requesting user), may indicate that another operation was previously requested in association with the user resource (e.g., and/or may provide information that identifies the other operation, a deadline associated with the other operation, etc.), or the like. In this way, a requesting user may determine how to resolve the denial to ensure that the operation is performed at another time.

As further shown in FIG. 6, if approval to perform the operation has been received from the one or more other users (block 640—YES), then process 600 may include providing an instruction to perform the operation and/or providing an indication that performance of the operation has been approved (block 660). For example, if network management system 210 receives all approvals from the other, non-requesting users (e.g., by the deadline), then network management system 210 may provide an instruction to perform the operation. For example, network management system 210 may provide the instruction to the shared network resource (e.g., to network element 240). The instruction may cause the network resource to perform the operation, such as by upgrading software or firmware, locking the resource, rebooting the resource, going offline, or the like.

Additionally, or alternatively, network management system 210 may provide an indication, to user device(s) 220 associated with the requesting user and/or the non-requesting user(s), that the operation has been approved. In this way, if the operation cannot be performed automatically by providing an instruction to the network resource, then the requesting user can ensure that the operation is performed. In some implementations, network management system 210 may provide an indication that the operation is being performed, has been completed, or the like. These indications may be provided via a user interface (e.g., of user device 220). In some implementations, if the operation is not performed within a threshold amount of time, network management system 210 may require re-approval before the operation can be performed.

In this way, network management system 210 coordinates operations, for shared network resources, among multiple users that share use of the shared network resources. This may ensure that one user does not cause performance of an operation that reduces availability, performance, etc. of a shared network resource being used by another user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
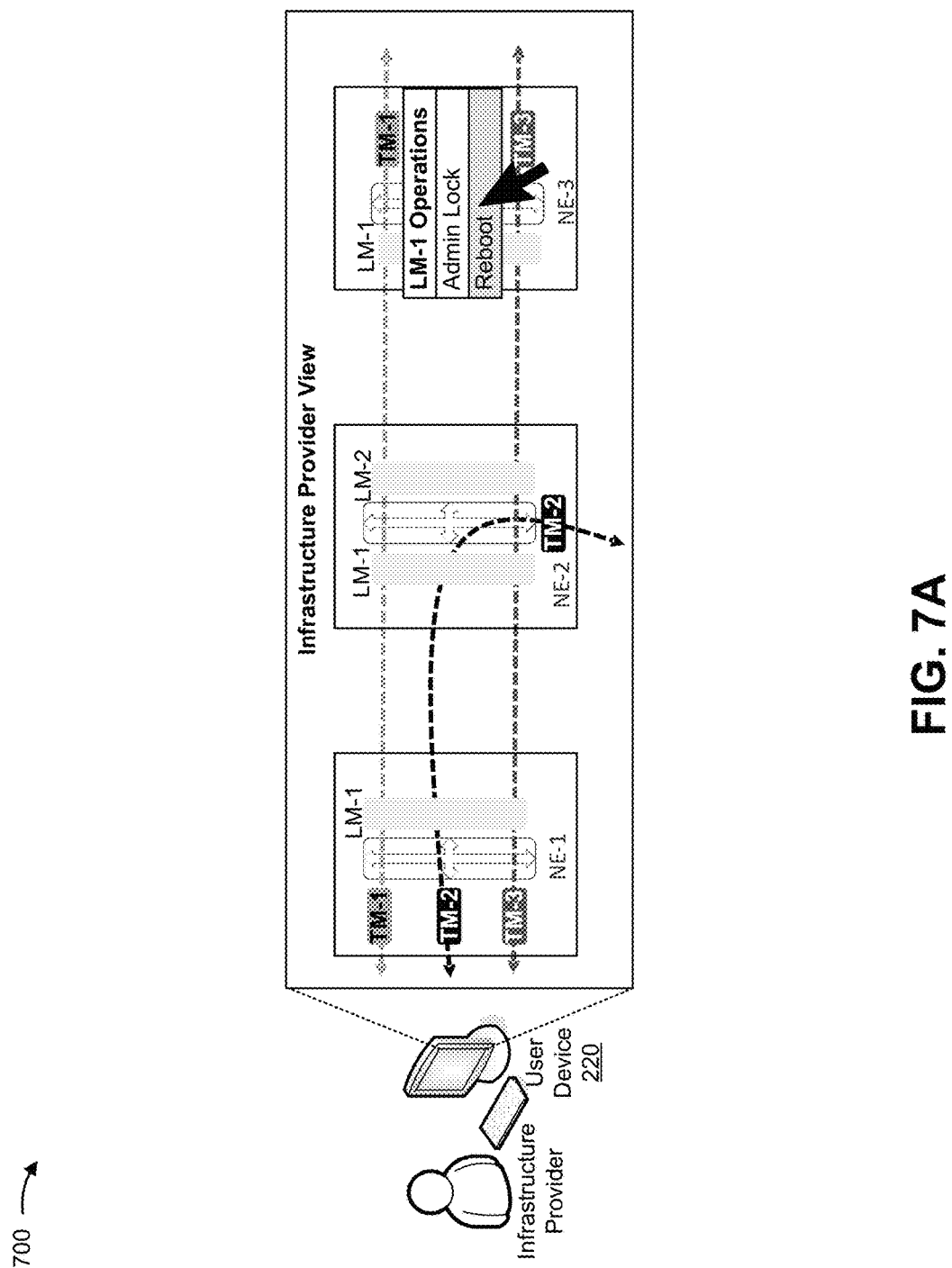
FIGS. 7A-7C are diagrams of an example implementation relating to the example process shown in FIG. 6.
Figure 7B:
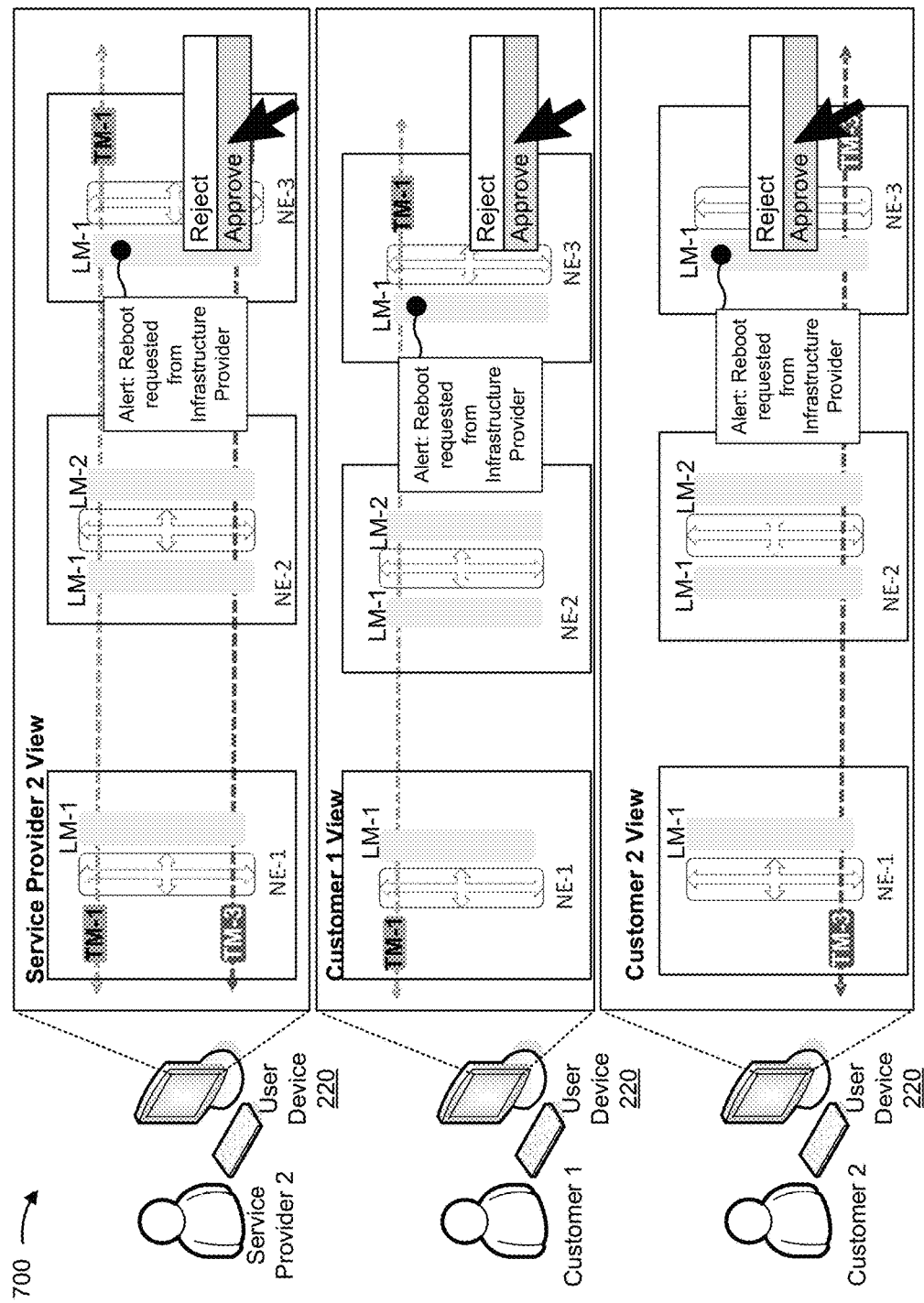
Figure 7C:
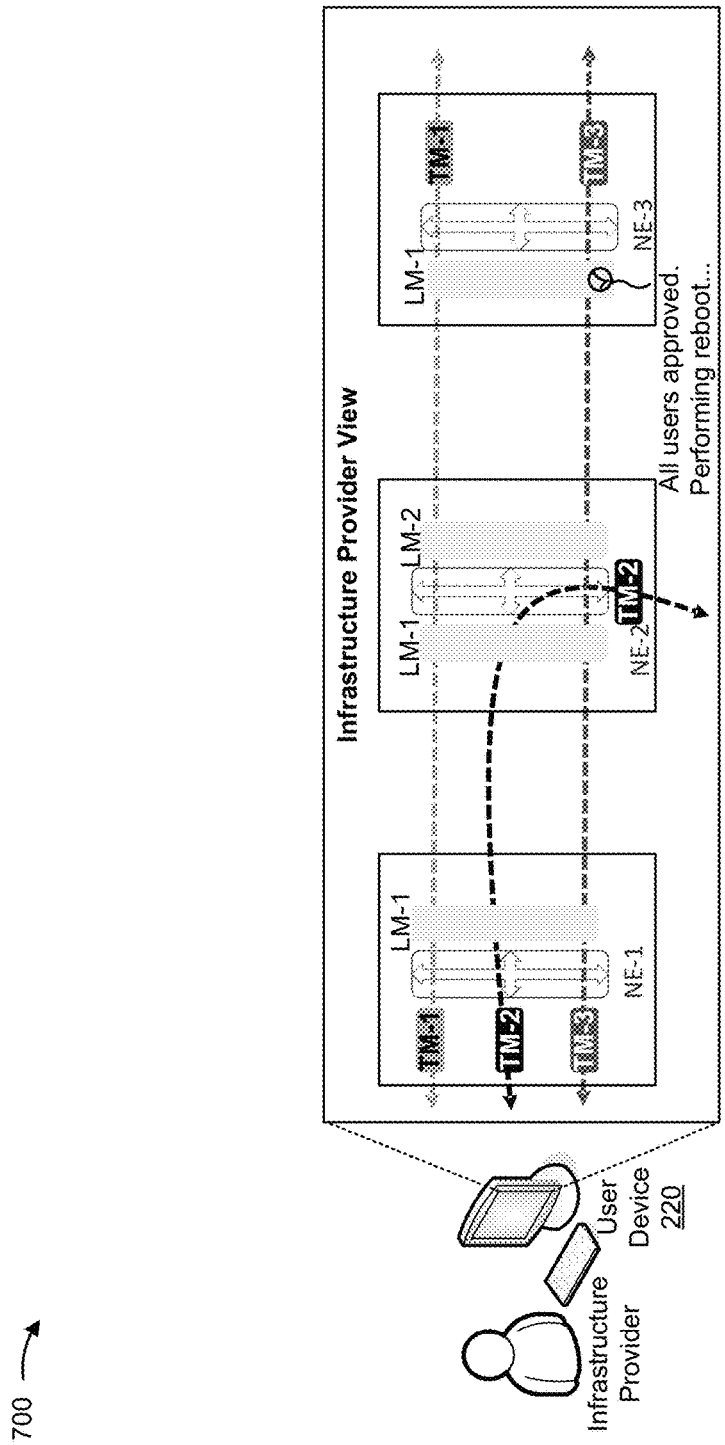

FIGS. 7A-7C are diagrams of an example implementation 700 relating to example process 600 shown in FIG. 6. FIGS. 7A-7C show an example of managing shared optical network resources. For the purpose of FIGS. 7A-7C, assume that the operations described herein in connection with FIGS. 5A-5F have been performed.

As shown in FIG. 7A, a user shown as Infrastructure Provider may interact with a user interface provided via user device 220. As shown, the Infrastructure Provider interacts with a representation of line module LM-1 of network element NE-3 to request that LM-1 be rebooted.

As shown in FIG. 7B, network management system 210 determines the other users that share LM-1 of NE-3. In this case, the other users are Service Provider 2, Customer 1, and Customer 2. As shown, network management system 210 provides a notification to user devices 220 corresponding to these users, and user devices 220 provide an alert for display. As shown, the alert indicates that the Infrastructure Provider has requested a reboot of LM-1 of NE-3. As shown, assume that all of the users provide approval for the reboot.

As shown in FIG. 7C, based on receiving the approvals, network management system 210 provides, to user device 220 associated with Infrastructure Provider, an indication that the reboot operation has been approved by all users that share LM-1 of NE-3. Further, network management system 210 may provide an instruction to NE-3 to reboot LM-1. In this way, network management system 210 may coordinate operations on network resources shared by multiple users, thereby reducing service disruptions.

As indicated above, FIGS. 7A-7C are provided merely as an example. Other examples are possible and may differ from what was described with regard to FIGS. 7A-7C.

Implementations described herein permit shared network resources to be viewed and/or modified by users with appropriate permission to view and/or modify the network resources (e.g., based on owning, leasing, licensing, etc. the network resources), thereby increasing network security. Furthermore, implementations described herein allow coordinated performance of operations, associated with a shared network resource, among users that share the network resource, thereby reducing service disruptions.

The foregoing disclosure provides illustration and description, but is not intended to be exhaustive or to limit the implementations to the precise form disclosed. Modifications and variations are possible in light of the above disclosure or may be acquired from practice of the implementations.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors configured to:
receive optical network information associated with an optical network;
determine a user associated with one or more network resources of the optical network,
the one or more network resources being shared for use by multiple users, including the user;
store the optical network information and information that identifies a relationship between the user and the one or more network resources;
receive a request for at least a portion of the optical network information associated with the user,
the at least the portion of the optical network information being associated with the one or more network resources associated with the user;
identify the one or more network resources, associated with the user, based on storing the optical network information and the information that identifies the relationship; and
provide the at least the portion of the optical network information, including information associated with the one or more network resources associated with the user, based on identifying the one or more network resources.

2. The device of claim 1, where the one or more processors are further configured to:
receive a request, associated with a requesting user, to perform an operation associated with a particular network resource of the one or more network resources;
identify one or more non-requesting users, different from the requesting user, that share the particular network resource; and
provide one or more notifications, of the request to perform the operation, to one or more user devices corresponding to the one or more non-requesting users.

3. The device of claim 2, where the one or more processors are further configured to:
determine whether one or more approvals, corresponding to the one or more non-requesting users, have been received; and
selectively provide, to a user device associated with the requesting user, an indication that the operation has been approved or denied based on determining whether the one or more approvals have been received.

4. The device of claim 3, where the indication is provided via a user interface or a protocol-specific message that indicates a status of the request.

5. The device of claim 1, where the one or more network resources include at least one of:
a shared network equipment associated with the optical network, or
a shared network service associated with the optical network.

6. The device of claim 1, wherein the one or more network resources include:

a network node included in the optical network, or
a component of the network node.

7. The device of claim 1, where the one or more processors, when receiving the request for the at least the portion of the optical network information, are configured to:
receive the request using a first protocol; and
where the one or more processors, when identifying the one or more network resources, are to:
provide a search query using a second protocol that is different from the first protocol,
the search query including a user identifier that identifies the user; and
identify the one or more network resources based on providing the search query.

8. The device of claim 1, where the at least the portion of the optical network information includes information associated with first network resources shared with the user, and does not include information associated with second network resources not shared with the user.

9. A non-transitory computer-readable medium storing instructions, the instructions comprising:
one or more instructions that, when executed by one or more processors, cause the one or more processors to:
determine a first user associated with a first network resource of an optical network;
determine a second user associated with the first network resource,
the first network resource being shared by the first user and the second user;
determine a second network resource associated with the second user and not associated with the first user;
store information that identifies a first relationship between the first user and the first network resource, information that identifies a second relationship between the second user and the first network resource, and information that identifies a third relationship between the second user and the second network resource;
receive a request for optical network information associated with the first user;
identify the first network resource as being associated with the first user based on storing the information that identifies the first relationship; and
provide the optical network information associated with the first user based on identifying the first network resource,
the optical network information associated with the first user including information associated with the first network resource and excluding information associated with the second network resource.

10. The non-transitory computer-readable medium of claim 9, where the one or more instructions, when executed by the one or more processors, further cause the one or more processors to:
receive a request, associated with the first user, to perform an operation associated with the first network resource;
determine that the second user is associated with the first network resource based on receiving the request to perform the operation and based on storing the information that identifies the second relationship; and
provide a notification of the request to perform the operation to a user device associated with the second user based on determining that the second user is associated with the first network resource.

11. The non-transitory computer-readable medium of claim 10, where the one or more instructions, when executed by the one or more processors, further cause the one or more processors to:
determine that approval to perform the operation has been received from the second user; and
provide, to a user device associated with the first user, an indication that the operation has been approved based on determining that approval to perform the operation has been received.

12. The non-transitory computer-readable medium of claim 10, where the one or more instructions, when executed by the one or more processors, further cause the one or more processors to:
determine that approval to perform the operation has been received from the second user; and
provide, to a network element that includes the first network resource, an instruction to perform the operation based on determining that approval to perform the operation has been received.

13. The non-transitory computer-readable medium of claim 10, where the one or more instructions, when executed by the one or more processors, further cause the one or more processors to:
determine that approval to perform the operation has not been received from the second user; and
provide, to a user device associated with the first user, an indication that the operation has not been approved based on determining that approval to perform the operation has not been received.

14. The non-transitory computer-readable medium of claim 9, where the first network resource includes at least one of:
a network element included in the optical network,
a multiplexer module associated with the network element,
a line module associated with the network element,
a transponder module associated with the network element, or
a physical end point associated with the network element.

15. A method, comprising:
determining, by a device, a plurality of users that share network resources associated with an optical network,
a first user, of the plurality of users, sharing a first network resource and not sharing a second network resource,
a second user, of the plurality of users, sharing the second network resource and not sharing the first network resource;
storing, by the device, information that identifies a first relationship between the first user and the first network resource and information that identifies a second relationship between the second user and the second network resource;
receiving, by the device, a first request for first optical network information associated with the first user;
receiving, by the device, a second request for second optical network information associated with the second user;
identifying, by the device, the first network resource as being associated with the first user based on storing the information that identifies the first relationship and based on receiving the first request;
identifying, by the device, the second network resource as being associated with the second user based on storing the information that identifies the second relationship and based on receiving the second request;

providing, by the device and to a first user device associated with the first user, the first optical network information based on identifying the first network resource,
  the first optical network information including information associated with the first network resource and excluding information associated with the second network resource; and
providing, by the device and to a second user device associated with the second user, the second optical network information based on identifying the second network resource,
  the second optical network information including information associated with the second network resource and excluding information associated with the first network resource.

16. The method of claim 15, further comprising:
receiving a third request, associated with the first user, to perform an operation that impacts an availability or a performance of the first network resource;
determining that a third user shares the first network resource with the first user based on receiving the third request; and
providing a notification of the third request to perform the operation to a third user device associated with the third user based on determining that the third user shares the first network resource with the first user.

17. The method of claim 16, further comprising:
determining that the third user has approved the third request to perform the operation after providing the notification; and
providing an instruction, to a network element that includes the first network resource, to perform the operation based on determining that the third user has approved the third request.

18. The method of claim 16, further comprising:
determining that the third user has approved the third request to perform the operation after providing the notification; and
providing a notification, to the first user device associated with the first user, that the third user has approved the third request to perform the operation based on determining that the third user has approved the third request.

19. The method of claim 16, further comprising:
determining that the third user has denied the third request to perform the operation after providing the notification; and
providing a notification, to the first user device associated with the first user, that the third user has denied the third request to perform the operation based on determining that the third user has denied the third request.

20. The method of claim 15, where the first network resource includes at least one of:
an optical transport service associated with the optical network,
an optical channel associated with the optical network,
an Optical Transport Unit (OTU) associated with the optical network, or
an Optical Data Unit (ODU) associated with the optical network.

* * * * *